United States Patent
Cho et al.

(10) Patent No.: US 11,567,363 B2
(45) Date of Patent: Jan. 31, 2023

(54) LIGHT CONTROL MEMBER, DISPLAY DEVICE AND METHOD OF FABRICATING DISPLAY DEVICE

(71) Applicant: Samsung Display Co., LTD., Yongin-si (KR)

(72) Inventors: Sung Won Cho, Hwaseong-si (KR); Yun Jong Yeo, Hwaseong-si (KR); Seon Il Kim, Hwaseong-si (KR); Youn Joon Kim, Seoul (KR); Dae Won Choi, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 318 days.

(21) Appl. No.: 17/022,459

(22) Filed: Sep. 16, 2020

(65) Prior Publication Data
US 2021/0173259 A1 Jun. 10, 2021

(30) Foreign Application Priority Data
Dec. 4, 2019 (KR) .......................... 10-2019-0159646

(51) Int. Cl.
| G02B 3/02 | (2006.01) |
| G02F 1/13357 | (2006.01) |
| G02B 5/04 | (2006.01) |
| G06F 1/16 | (2006.01) |
| G02F 1/1335 | (2006.01) |

(52) U.S. Cl.
CPC ....... *G02F 1/133606* (2013.01); *G02B 5/045* (2013.01); *G06F 1/1609* (2013.01); *G02F 1/133607* (2021.01)

(58) Field of Classification Search
CPC ......... G02F 1/133606; G02F 1/133607; G02B 5/045; G06F 1/1609
USPC ........................................................ 359/720
See application file for complete search history.

(56) References Cited

FOREIGN PATENT DOCUMENTS

| CN | 209560259 U | * 10/2019 |
| KR | 10-2010-0018552 | 2/2010 |
| KR | 10-2011-0064285 | 6/2011 |
| KR | 10-2018-0003859 | 1/2018 |

* cited by examiner

*Primary Examiner* — William Choi
(74) *Attorney, Agent, or Firm* — Kile Park Reed & Houtteman PLLC

(57) ABSTRACT

A light control member includes a light control substrate including a surface, and a scalene prism disposed on the light control substrate. The scalene prism includes a first side surface extended at a first angle with respect to the surface of the light control substrate, and a second side surface extended at a second angle with respect to the surface of the light control substrate, the second angle being greater than the first angle. The light control member includes an etching stopper disposed on the scalene prism, and at least one absorption pattern disposed on the etching stopper on the second side surface of the scalene prism.

24 Claims, 20 Drawing Sheets

LIGHT CONTROL MEMBER, DISPLAY DEVICE AND METHOD OF FABRICATING DISPLAY DEVICE

CROSS REFERENCE TO RELATED APPLICATION(S)

This application claims priority to and benefits of Korean Patent Application No. 10-2019-0159646 under 35 U.S.C. § 119, filed in the Korean Intellectual Property Office on Dec. 4, 2019, the entire contents of which are incorporated herein by reference.

BACKGROUND

1. Technical Field

The disclosure relates to a light control member, a display device and a method of fabricating the same.

2. Description of the Related Art

Display devices are for displaying images and may include a display panel such as an organic light-emitting display panel or a liquid-crystal display panel.

The exit angle at which light exits through the display surface of a display device may be the viewing angle for a viewer. A wider viewing angle provides the advantage that the display surface can be viewed without distortion regardless of a viewer's position. However, it may be necessary to limit the viewing angle in a particular environment, e.g., in case that the display is used in a traveling vehicle. To this end, a light control member for controlling the angle at which the light exits, for example, the viewing angle, may be disposed on the display panel.

SUMMARY

An embodiment of invention may provide a light control member that can easily control a viewing angle as desired.

Another embodiment of invention may provide a display device including a light control member that can easily control a viewing angle as desired.

Still another embodiment of invention may provide a method of fabricating a display device including a light control member that can easily control a viewing angle as desired.

According to an embodiment, a light control member may include a light control substrate including a surface, and a scalene prism disposed on the light control substrate. The scalene prism may include a first side surface extended at a first angle with respect to the surface of the light control substrate, and a second side surface extended at a second angle with respect to the surface of the light control substrate, the second angle being greater than the first angle. The light control member may include an etching stopper disposed on the scalene prism, and at least one absorption pattern disposed on the etching stopper on the second side surface of the scalene prism.

The etching stopper may be disposed on the first side surface and the second side surface of the scalene prism.

The etching stopper may comprise a resin.

The at least one absorption pattern may be in direct contact with the etching stopper on the second side surface of the scalene prism.

A refractive index of the scalene prism may be approximately 1.6, a refractive index of the etching stopper may be greater than the refractive index of the scalene prism, and the etching stopper may comprise at least one of indium-tin-oxide (ITO), zirconium oxide (ZrOx), hafnium oxide (HfOx) and aluminum oxide (Al2O3).

The scalene prism may comprise a first prism part in contact with the light control substrate, and at least one second prism part extended from the first prism part and having a triangular, cross-sectional shape.

The cross-sectional shape of the second prism part may comprise a scalene triangular shape.

The at least one second prism part may comprise a plurality of second prism parts, the at least one absorption pattern may comprise a plurality of absorption patterns, and the plurality of absorption patterns may be disposed on second side surfaces of the plurality of second prism parts, respectively.

A height of each of the plurality of absorption patterns in a thickness direction may be approximately 1.1 to approximately 1.4 times a pitch between adjacent ones of the plurality of absorption patterns.

A surface height of the at least one absorption pattern may be smaller than a surface height of the etching stopper.

A thickness of the etching stopper disposed on the first side surface of the scalene prism may be equal to a thickness of the etching stopper disposed on the second side surface of the scalene prism.

A thickness of the etching stopper disposed on the first side surface of the scalene prism may be greater than a thickness of the etching stopper disposed on the second side surface of the scalene prism.

Each of the etching stopper and the at least one absorption pattern may comprise protrusions on a surface thereof, and a depth of the protrusions of the at least one absorption pattern may be larger than a depth of the protrusions of the etching stopper.

According to another embodiment, a display device may include a first substrate, a light-emitting element disposed on the first substrate, and a light control member disposed on the light-emitting element. The light control member may include a light control substrate including a surface, and a scalene prism disposed on the light control substrate. The scalene prism may include a first side surface extended at a first angle with respect to the surface of the light control substrate, and a second side surface extended at a second angle with respect to the surface of the light control substrate, the second angle being greater than the first angle. The light control member may include an etching stopper disposed on the scalene prism, and an absorption pattern disposed on the etching stopper on the second side surface of the scalene prism.

The scalene prism may be disposed between the light control substrate and the light-emitting element, and the etching stopper may be disposed between the scalene prism and the light-emitting element.

The light-emitting element may comprise a first electrode disposed on the first substrate, a second electrode facing the first electrode, and an emissive layer disposed between the first electrode and the second electrode.

The display device may further comprise a bank layer disposed on the first electrode and having an opening, wherein a part of an upper surface of the first electrode may be exposed through the opening, and the emissive layer may be disposed in the opening.

The display device may further comprise a second substrate facing the first substrate and disposed above the light-emitting element. The second substrate seals the light-emitting element, and the light control member may be disposed on the second substrate.

The display device may further comprise an encapsulation layer disposed over the light-emitting element and encapsulating the light-emitting element, wherein the light control member may be disposed on the encapsulation layer.

According to still another embodiment, a method of fabricating a display device may include forming a light control member, and attaching the light control member to a display panel. The forming the light control member may include forming a scalene prism on a substrate, the scalene prism comprising a first side surface extended at a first angle with respect to a surface of the substrate and a second side surface extended at a second angle with respect to the substrate, forming an etching stopper on the scalene prism, and forming an absorption pattern on the etching stopper on the second side surface of the scalene prism.

The first angle of the first side surface may be greater than the second angle of the second side surface.

The scalene prism may comprise a resin, and the forming the scalene prism may comprise forming the scalene prism by imprinting.

The forming the etching stopper may comprise forming the etching stopper by atomic layer deposition (ALD), chemical vapor deposition (CVD), or sputtering.

The forming the absorption pattern on the etching stopper on the second side surface of the scalene prism may comprise forming an absorption pattern material over the etching stopper, and dry etching to expose the etching stopper on the first side surface of the scalene prism.

It should be noted that the disclosure is not limited to the above-mentioned aspects, and that other aspects of the disclosure will be apparent to those skilled in the art from the following descriptions.

According to an embodiment of the disclosure, it may be possible to easily control a viewing angle as desired.

Features of the invention are not restricted to those set forth herein. The above and other features of the invention will become more apparent to one of ordinary skill in the art to which the invention pertains by referencing the detailed description of the invention given below.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
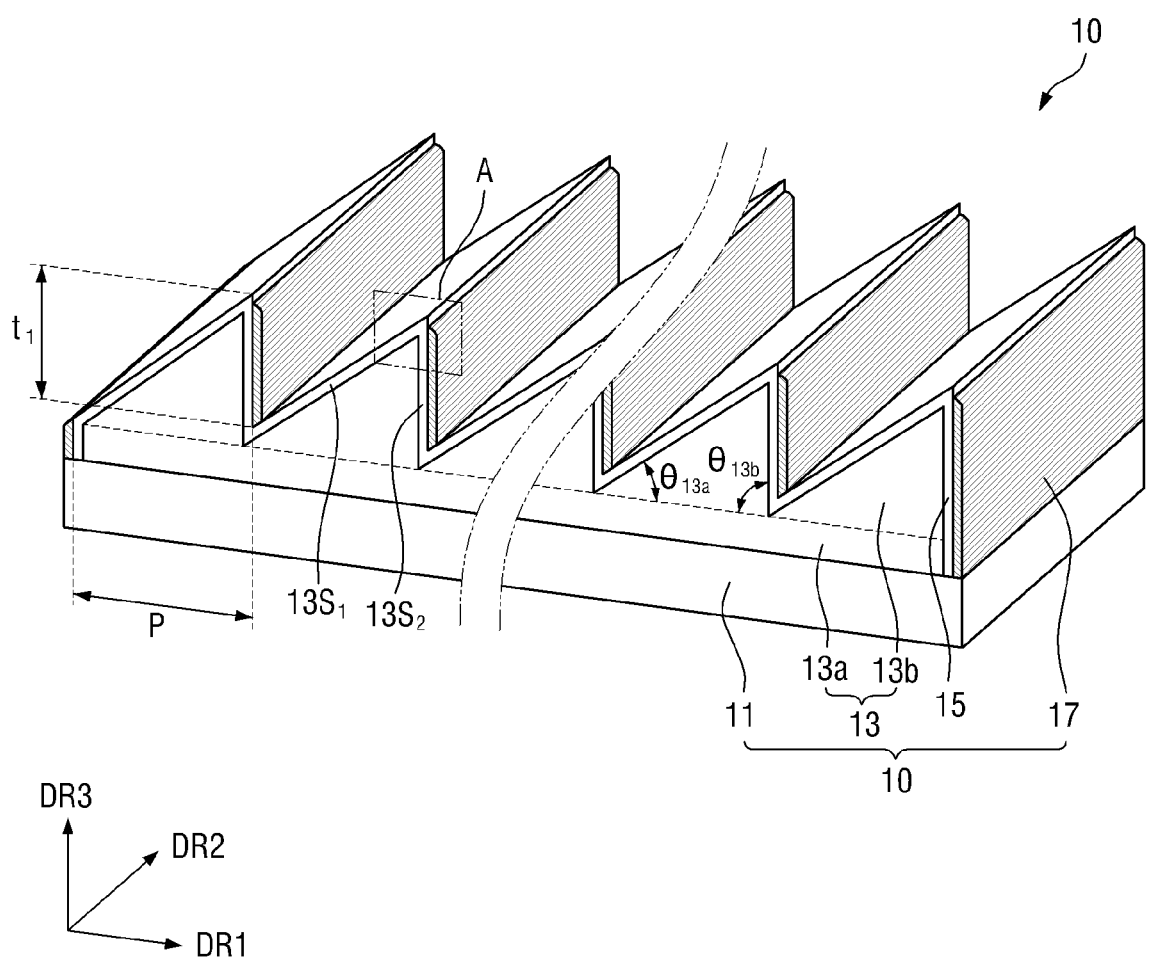
FIG. 1 is a schematic cross-sectional view of a light control member according to an embodiment of the disclosure.

Specific structural and functional descriptions of embodiments disclosed herein are only for illustrative purposes of the embodiments. Embodiments may take many different forms without departing from the spirit and significant characteristics of the disclosure. Therefore, embodiments are disclosed only for illustrative purposes and should not be construed as limiting the invention. That is, the invention is only defined by the scope of the claims including any equivalents.

It will be understood that when an element is referred to as being related to another element such as being "coupled" or "connected" to another element, it can be directly coupled or connected to the other element or intervening elements may be present therebetween. In contrast, it should be understood that when an element is referred to as being related to another element such as being "directly coupled" or "directly connected" to another element, there may be no intervening elements present. Other expressions that explain the relationship between elements, such as "between," "directly between," "adjacent to," or "directly adjacent to," should be construed in the same way.

Throughout the specification, the same reference numerals will refer to the same or like parts.

It will be understood that, although the terms "first," "second," "third" etc. may be used herein to describe various elements, components, regions, layers and/or sections, these elements, components, regions, layers and/or sections should not be limited by these terms. These terms may be used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." The terms "and" and "or" generally may be interpreted as "and/or." As used herein, the term "and/or" includes any and all combinations of one or more of the associated listed items. It will be further understood that the terms "comprises", "comprising," "has", "have", "having", "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

The phrase "at least one of" is intended to include the meaning of "at least one selected from the group of" for the purpose of its meaning and interpretation. For example, "at least one of A and B" may be understood to mean "A, B, or A and B."

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" or "approximately" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures may be schematic in nature and their shapes may not be intended to illustrate the precise shape of a region and are not intended to limit the scope of the claims.

Hereinafter, embodiments will be described with reference to the attached drawings.

FIG. 1 is a schematic cross-sectional view of a light control member according to an embodiment of the disclosure.

The light control member 10 according to the embodiment may be used in a display device for displaying images. The display device may be included in portable electronic devices such as a mobile phone, a smart phone, a tablet personal computer (PC), a smart watch, a watch phone, a mobile communications terminal, an electronic notebook, an electronic book, a portable multimedia player (PMP), a navigation device, a ultra mobile PC (UMPC), as well as a variety of electronic devices such as a television, a laptop computer, a monitor, a billboard and an Internet of Things device. Although the light control member 10 may be used in a display device for vehicles in the example shown, it is to be understood that the light control member 10 may be applied to other display devices.

Referring to FIG. 1, the light control member 10 according to the embodiment may be coupled with a display part including a screen on which images may be displayed. The display part may include a display panel that generates images to display the images. The display panel may be an organic display panel including a self-luminous, organic layer, or may be an inorganic display panel including a self-luminous, inorganic semiconductor layer, such as a nano LED and a micro LED. As another example, the display panel may be a liquid-crystal display panel.

When the light control member 10 may be combined with one of the above-described display panels, the light control member 10 may control the path of the light emitted from the display panel. For example, in case that the light emitted from the display panel may be in the visible wavelength band, the light control member 10 may control the path of light in the visible wavelength band. As another example, in case that the light emitted from the display panel may be in the ultraviolet light or infrared wavelength band, the light control member 10 may control the optical path of light in the ultraviolet light or infrared wavelength band. As still another example, the light control member 10 may control light that encompasses the visible light wavelength band and other wavelength bands (ultraviolet or infrared light wavelength bands).

According to the embodiment, the light control member 10 may include a light control substrate 11, a scalene prism 13 disposed on the light control substrate 11, an etching stopper 15 disposed on the scalene prism 13, and an absorption pattern 17 disposed on the etching stopper 15.

The light control substrate 11 may be a transparent insulating substrate. The light control substrate 11 may include a rigid material such as glass, quartz, or a combination thereof. For example, the light control substrate 11 may include a transparent insulating rigid material. The light control substrate 11 may have a refractive index of approximately 1.5. It is, however, to be understood that the disclosure is not limited thereto. The light control substrate 11 may be a flexible substrate including a flexible material such as polyimide (PI). In such case, the light control substrate 11 may be bent, curved, folded or rolled.

The scalene prism 13 may be disposed on the light control substrate 11. The scalene prism 13 may be disposed on (e.g., directly on) a surface of the light control substrate 11. The scalene prism 13 may include a first prism part 13a disposed on (e.g., directly on) the surface of the light control substrate 11 and second prism parts 13b disposed on the first prism part 13a.

The first prism part 13a may have a rectangular, cross-sectional shape. An upper surface of the first prism part 13a may be extended along a direction in which the second prism parts 13b may be arranged, and side surfaces of the second prism parts 13b may be extended in a thickness direction intersecting the direction in which the second prism parts 13b may be arranged in the drawings.

Each of the second prism parts 13b may have a first side surface $13S_1$ extended at a first angle $\theta_{13a}$ with respect to the surface of the light control substrate 11, and a second side surface $13S_2$ extended at a second angle $\theta_{13b}$. The second angle $\theta_{13b}$ may be greater than the first angle $\theta_{13a}$. The first angle $\theta_{13a}$ and the second angle $\theta_{13b}$ may vary depending on different designs for adjusting the exit angle. For example, the second angle $\theta_{13b}$ may be a right angle or an obtuse angle, while the first angle $\theta_{13a}$ may be an acute angle. The second angle $\theta_{13b}$ may range from approximately 90° to approximately 110° or from approximately 90° to approximately 100°, or may be approximately 90°. The first angle $\theta_{13a}$ may range from approximately 30° to approximately 80° or from approximately 60° to approximately 70°. As another example, the second angle $\theta_{13b}$ may be an acute angle. As another example, the second angle $\theta_{13b}$ may be an acute angle larger than the first angle $\theta_{13a}$.

The second prism parts 13b may have a triangular cross-sectional shape. Specifically, the bottom surface of each of second prism parts 13b in contact with the first prism part 13a may form the bottom side of a triangle and the side surfaces 1351 and $13S_2$ of each of the second prism parts 13b may form the sides of the triangle. In case that the second angle $\theta_{13b}$ may be 90°, the cross-sectional shape of the second prism parts 13b may have a right triangle shape.

The second prism parts 13b may be arranged along a direction. The second prism parts 13b all may have the same cross-sectional shape. It is, however, to be understood that the disclosure is not limited thereto.

The scalene prism 13 may serve to control the path of light incident on the scalene prism 13. More specifically, the scalene prism 13 may have a larger refractive index than that of a medium light reaches before the scalene prism 13, thereby changing the path of the light so that the light incident on the scalene prism 13 travels more vertically. For example, the scalene prism 13 may have a refractive index larger than the light control substrate 11. The scalene prism 13 may have a refractive index of approximately 1.6.

The scalene prism 13 may include an organic insulating material. The scalene prism 13 may include, for example, an insulating resin. The first prism part 13a and the second prism parts 13b may include the same insulating resin. The first prism part 13a and the second prism parts 13b may be integrally formed at the same time via a same fabricating process. For example, the first prism part 13a and the second prism parts 13b may be formed by imprinting. It is, however, to be understood that the disclosure is not limited thereto. For example, the first prism part 13a may be first formed on the surface of the light control substrate 11, and the second prism parts 13b may be formed on the first prism part 13a. In case that the first prism part 13a and the second prism parts 13b may be formed sequentially, an air layer may be formed as the boundary between them. It is, however, to be understood that the disclosure is not limited thereto. The first prism part 13a and the second prism parts 13b may be formed with no boundary therebetween as if they were formed simultaneously.

The etching stopper 15 may be disposed on the scalene prism 13. The etching stopper 15 may be integrally formed with and disposed on the scalene prism 13. The etching stopper 15 may be disposed on the first side surface $13S_1$ and the second side surface $13S_2$ of the scalene prism 13, and on the two side surfaces of the first prism part 13a, to cover the scalene prism 13. In an embodiment, the etching stopper 15 may cover the entire surface of the scalene prism 13 including the first side surface $13S_1$ and the second side surface $13S_2$. As the etching stopper 15 may cover the scalene prism 13, it may be possible to prevent surfaces of the scalene prism 13 from being damaged due to overetching during a dry etching process for forming the absorption pattern 17 on the second side surface $13S_2$ of the scalene prism 13, which is to be described later. In view of the above, it may be desired that the etching ratio of the etching stopper 15 with respect to the etching gas of the dry etching may be lower than that of the absorption pattern 17. The larger the etch selectivity may be, which may be the difference between the etching ratios, the better the etching stopper 15 can protect surfaces of the scalene prism 13.

For example, the etching stopper 15 may include at least one of indium-tin-oxide (ITO), zirconium oxide (ZrOx), hafnium oxide (HfOx) and aluminum oxide ($Al_2O_3$) having a lower etching ratio with respect to the etching gas used for etching the absorption pattern 17 than the material of the absorption pattern 17 to be described later.

As the etching stopper 15 may be disposed on the first side surface $13S_1$ of the scalene prism 13, light exiting from the display panel may reach the portions of the etching stopper 15 before portions of the scalene prism 13. As the etching stopper 15 may be located in the path of light, it may be desired that the refractive index of the etching stopper 15 may be equal to or greater than that of the scalene prism 13 in order to guide the light in the vertical direction of the scalene prism 13. In view of the above, the refractive index of the etching stopper 15 may be equal to or greater than approximately 1.6, which may be the above-described refractive index of the scalene prism 13. Since the etching stopper 15 may be made of at least one of ITO, ZrOx, HfOx and $Al_2O_3$ having a lower etching ratio with respect to the etching gas used for etching the absorption pattern 17 than the material of the absorption pattern 17, whose refractive indices may be approximately 1.8, approximately 2.2, approximately 1.9 and approximately 1.7, respectively, the etching stopper 15 can satisfy the above condition.

The etching stopper 15 may be formed on the surfaces of the scalene prism 13 by atomic layer deposition (ALD). By forming the etching stopper 15 on the surface of the scalene prism 13 in this manner, the etching stopper 15 may have not only the shape conforming to the scalene prism 13 but also a uniform thickness. In an embodiment, the etching stopper 15 may have a uniform thickness in its entire area. In case that the etching stopper 15 located in the light path has a uniform thickness, it may be easier to adjust the path of the light incident through the light control member 10.

The absorption pattern 17 may be disposed on the etching stopper 15, which may be disposed on the scalene prism 13. The absorption pattern may be disposed on the etching stopper 15 disposed on the second side surface $13S_2$ of the scalene prism 13. As described above, since the etching stopper 15 may be disposed and cover the scalene prism 13, the absorption pattern 17 may not be in contact with the scalene prism 13.

The etching stopper 15 and the absorption pattern 17 will be described in more detail with reference to FIG. 4.

Figure 4:
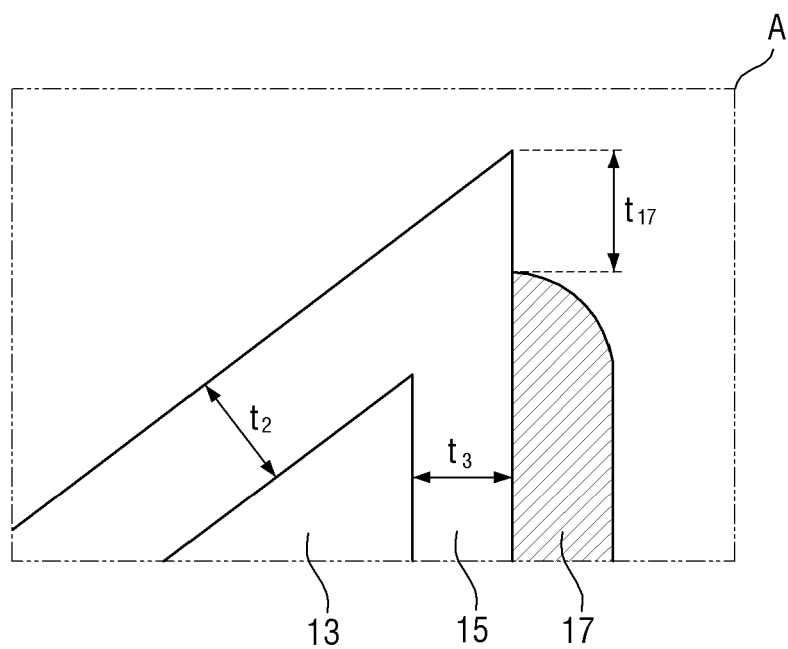
FIG. 4 is a schematic enlarged view of area A shown in FIG. 1.

FIG. 4 is a schematic enlarged view of area A shown in FIG. 1.

Referring to FIG. 4, as described above with reference to FIG. 1, the etching stopper 15 may be formed on surfaces of the scalene prism 13 by the atomic layer deposition (ALD), so that it may have a uniform thickness. Specifically, the thickness $t_2$ of the portion of the etching stopper that may be disposed on the first side surface $13S_1$ of the scalene prism 13 may be substantially equal to the thickness $t_3$ of the portion of the etching stopper that may be disposed on the second side surface $13S_2$ of the scalene prism 13. Specifically, a difference between the thickness $t_2$ of the portion of the etching stopper that may be disposed on the first side surface $13S_1$ of the scalene prism 13 and the thickness $t_3$ of the portion of the etching stopper that may be disposed on the second side surface $13S_2$ of the scalene prism 13 may be approximately 10%, approximately 5%, or approximately 1% or less.

The absorption pattern 17 may be formed on the surface (or the entire surface) of the etching stopper 15 having a shape conforming to the shape of the scalene prism 13 and then may be subjected to dry etching, according to a method of fabricating a display device to be described later. The absorption pattern material on the first side surface $13S_1$ of the scalene prism 13 may have a smaller thickness in the thickness direction than the absorption pattern material disposed on the second side surface $13S_2$ of the scalene prism 13, and thus the absorption pattern material on the first side surface $13S_1$ may be removed. The absorption pattern material on the second side surface $13S_2$ of the scalene prism 13 may remain even after the absorption pattern material on the first side surface $13S_1$ of the scalene prism 13 may be removed. As a result, the absorption pattern 17 as shown in FIGS. 1 and 4 may be formed. As shown in FIG. 4, the absorption pattern 17 may expose a part of the upper end of the etching stopper 15. The exposed part may be formed as the absorption pattern material disposed on the second side surface $13S_2$ of the scalene prism 13 is also partially removed by the dry etching. The length or width t17 of the exposed part may be larger than or smaller than the second thickness $t_2$.

The absorption pattern 17 may be disposed on the second side surface $13S_2$ of each of the second prism parts 13b of the scalene prism 13. In case that lights may be incident on the light control member 10, the absorption pattern 17 may absorb some of the lights incident thereon to control the paths of the lights. In case that the second angle $\theta_{13b}$ of the second side surface $13S_2$ of each of second prism parts 13b may be, for example, a right angle, as the thickness of the etching stopper 15 may be substantially uniform in its entire area as described above, the absorption pattern 17 may have a shape extended in the vertical direction in the drawings.

The absorption pattern 17 may be disposed on the second side surface $13S_2$ of every second prism part 13b and may be repeated with a pitch P. The length or height t1 of the absorption pattern 17 may be designed taking into account the pitch P of the adjacent absorption patterns 17. For example, the length $t_1$ of the absorption pattern 17 may be approximately 1.3 times or more, or approximately 1.2 times the pitch P of the absorption patterns 17. In order to prevent the light out of a viewing angle from exiting through the light control member 10, the length $t_1$ of the absorption pattern 17 may need to lie in the above ranges.

According to an embodiment of the disclosure, the light control member 10 may have a refractive index larger than that of the medium light reaches before the scalene prism 13 in order to change the path of the light. This allows the length $t_1$ of the absorption pattern 17 to be reduced as the light may be converted in the vertical direction as it passes through the scalene prism 13. By reducing the length $t_1$ of the absorption pattern 17, the amount of light absorbed by the absorption pattern 17 may be reduced, thereby increasing the overall transmittance of the light control member 10.

Hereinafter, the light absorption process by the absorption pattern 17 and the light path control process by the scalene prism 13 will be described in more detail with reference to FIG. 2.

Figure 2:
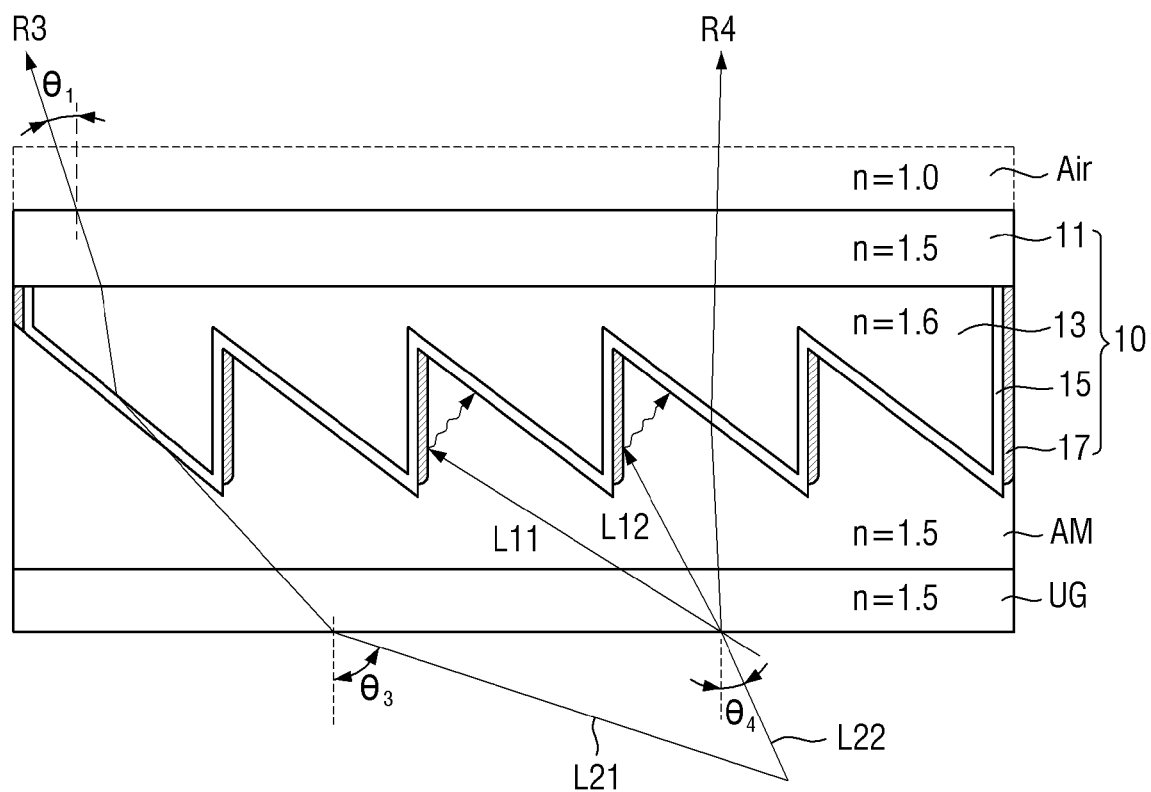
FIG. 2 is a schematic view showing light paths passing through the light control member of FIG. 1.

FIG. 2 is a schematic view showing light paths passing through the light control member of FIG. 1.

Referring to FIG. 2, in an embodiment, an adhesive member AM may be disposed under the light control member 10, and a glass substrate UG may be attached under the adhesive member AM. The adhesive member AM may serve to couple the light control member 10 with the glass substrate UG. The adhesive member AM may include a transparent, adhesive material because the glass substrate UG may need to transmit the light to the light control member 10 without loss. For example, the adhesive member AM may be, but is not limited to, an optically clear adhesive (OCA) or an optically clear resin (OCR).

In the example shown in FIG. 2, the refractive index of the glass substrate UG may be approximately 1.5, the refractive index of the adhesive member AM may be approximately 1.5, the refractive index of the scalene prism 13 of the light control member 10 may be approximately 1.6, the refractive index of the light control substrate may be approximately 1.5, and the refractive index of the air layer above the light control board 11 may be approximately 1.0, for convenience of illustration.

Lights L11, L12, L21 and L22 incident through the glass substrate UG may pass through the glass substrate UG and the adhesive member AM. As the glass substrate UG and the adhesive member AM have the same refractive index, the lights L11, L12, L21 and L22 may not be refracted on the interface therebetween.

A (1-1) light L11 and a (1-2) light L12 may be incident on the absorption pattern 17. The lights L11 and L12 incident on the absorption pattern 17 may be absorbed by the absorption pattern 17 as described above with reference to FIG. 1 and extinguished. More detailed descriptions thereof will be given with reference to FIG. 3.

Figure 3:
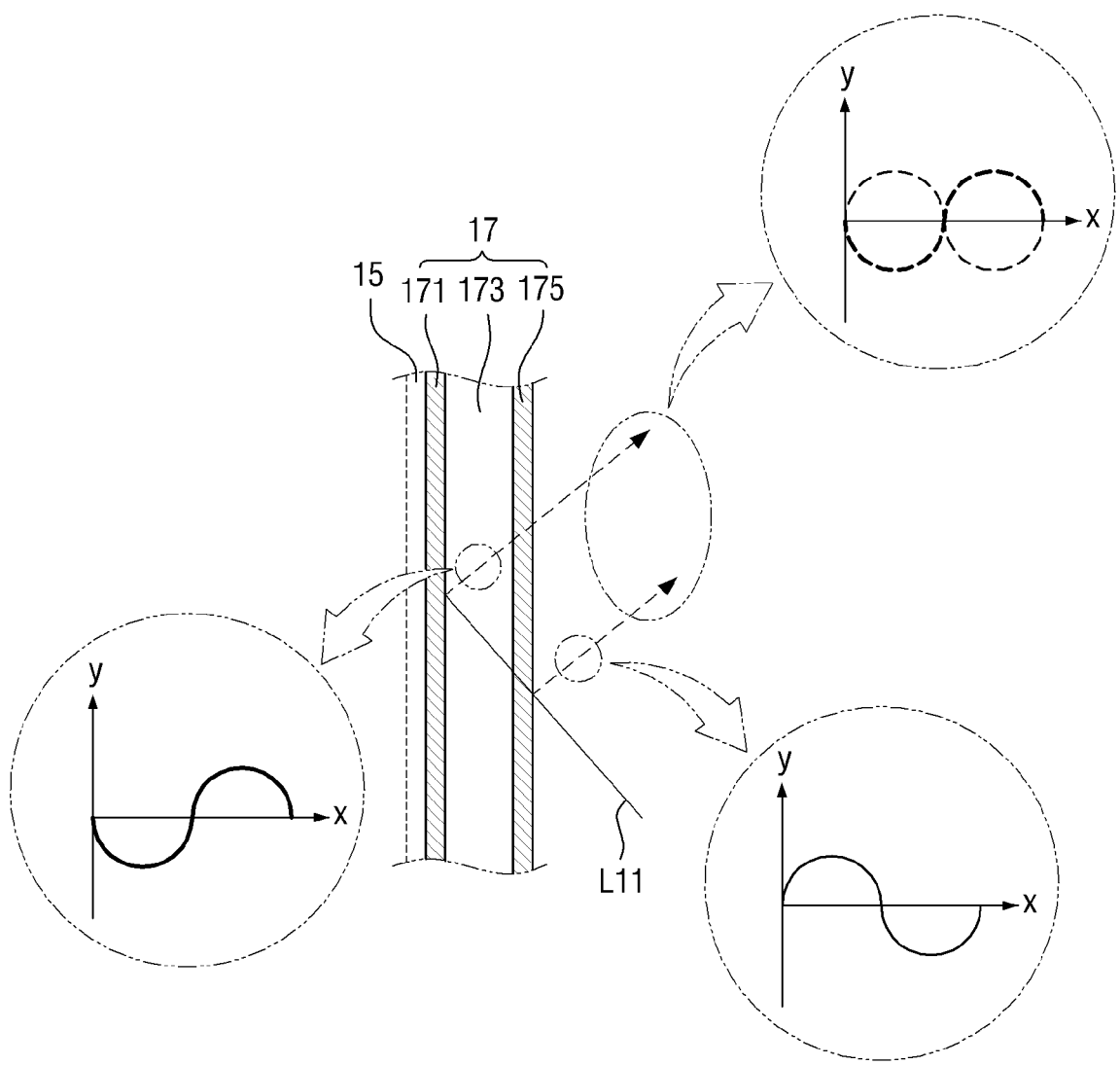
FIG. 3 is a schematic view showing in detail the path of the (1-1) light of FIG. 2.

FIG. 3 is a schematic view showing in detail the path of the (1-1) light of FIG. 2.

Referring to FIG. 3, the absorption pattern 17 may have multiple layers. The multiple layers may have at least one metal layer and at least one insulating layer. The absorption pattern 17 may include multiple layers of metal layers and insulating layers alternately stacked on one another. In the example shown in FIG. 3, the absorption pattern 17 includes a first metal layer 171 disposed on (e.g., directly on) the side surface of the etching stopper 15, an insulating layer 173 disposed on (e.g., directly on) the first metal layer 171, and a second metal layer 175 disposed on (e.g., directly on) the insulating layer 173. It is, however, to be understood that the disclosure is not limited thereto.

The metal layers 171 and 173 may include at least one of cobalt (Co), tantalum (Ta) and aluminum (Al). The first metal layer 171 and the second metal layer 175 may be made of the same material. Although each of the first metal layer 171 and the second metal layer 175 includes tantalum (Ta) in the example shown, the disclosure is not limited thereto.

The (1-1) light L11 incident on the absorption pattern 17 may be reflected by the second metal layer 175 or may pass through the second metal layer 175 and the insulating layer 173 to be reflected by the first metal layer 171. The spacing between the first metal layer 171 and the second metal layer 175, i.e., the width or thickness of the insulating layer 173 may be determined based on a path difference between the light reflected by the second metal layer 175 and the light reflected by the first metal layer 171 to allow for destructive interference.

For example, the amplitude (y-axis) versus time (x-axis) of the light reflected by the second metal layer 175 may have a same amount but an opposite polarity with respect to the light reflected by the first metal layer 171. For example, the light reflected by the second metal layer 175 and the light reflected by the first metal layer 171 may cancel each other and accordingly the (1-1) light L11 reflected may be absorbed.

According to an embodiment of the disclosure, the exit emission angle $\theta_1$ or the viewing angle of the light passing through the light control member 10 may range from approximately 0° to approximately 30°. The (2-1) light L21 may be incident on the glass substrate UG with an incident angle $\theta_3$ greater than the incident angle $\theta_4$ of the (2-2) light L22. The (2-1) light L21 and the (2-2) light L22 may be refracted at the interface between the glass substrate UG and the air such that they travel more vertically. They may pass through the interface between the glass substrate UG and the adhesive member AM without being refracted and may be incident on the light control member 10.

Since the scalene prism 13 of the light control member 10 may have a larger refractive index than that of the adhesive member AM thereunder, the (2-1) light L21 and the (2-2) light L22 incident on the light control member 10 may be refracted more upward and may travel toward the interface between the scalene prism 13 and the light control substrate 11. Since the refractive index of the light control substrate 11 may be smaller than that of the scalene prism 13, the lights may be refracted more downward at the interface between the scalene prism 13 and the light control substrate 11. The (2-1) light L21 and the (2-2) light L22 which have passed through the light control board 11 may be refracted toward the lower side at the interface between the light control substrate 11 and the air layer and exit. In order to have the exit angle $\theta_1$ of the (2-1) light L21 (e.g., R3) and the (2-1) light L22 (e.g., R4) in the range of approximately 0° to approximately 30°, the incidence angle may be set in the range of approximately 7.6° to approximately 69.4°.

If there may be no scalene prism 13, in order to have the exit angle θ1 in the range of approximately 0° to approximately 30°, the incidence angle also should be in the range of approximately 0° to approximately 30°. In contrast, by employing the scalene prism 13 according to an embodiment, the incidence angle may be greatly increased, and accordingly the incidence area may increase. In this manner, light can be incident on a larger incidence area and thus light transmittance can be improved.

As described above with reference to FIG. 1, light can be changed toward the vertical direction while passing through the scalene prism 13 and thus it may not be necessary to greatly increase the length $t_1$ of the absorption pattern 17. Therefore, the length $t_1$ of the absorption pattern 17 can be reduced. By reducing the length $t_1$ of the absorption pattern 17, the amount of light absorbed by the absorption pattern 17 may be reduced, thereby increasing the overall transmittance of the light control member 10.

Hereinafter, a method of fabricating a display device including a light control member according to an embodiment of the disclosure will be described. In the following description, the same or similar elements will be denoted by the same or similar reference numerals, and redundant descriptions will be omitted or briefly described.

Figure 5:
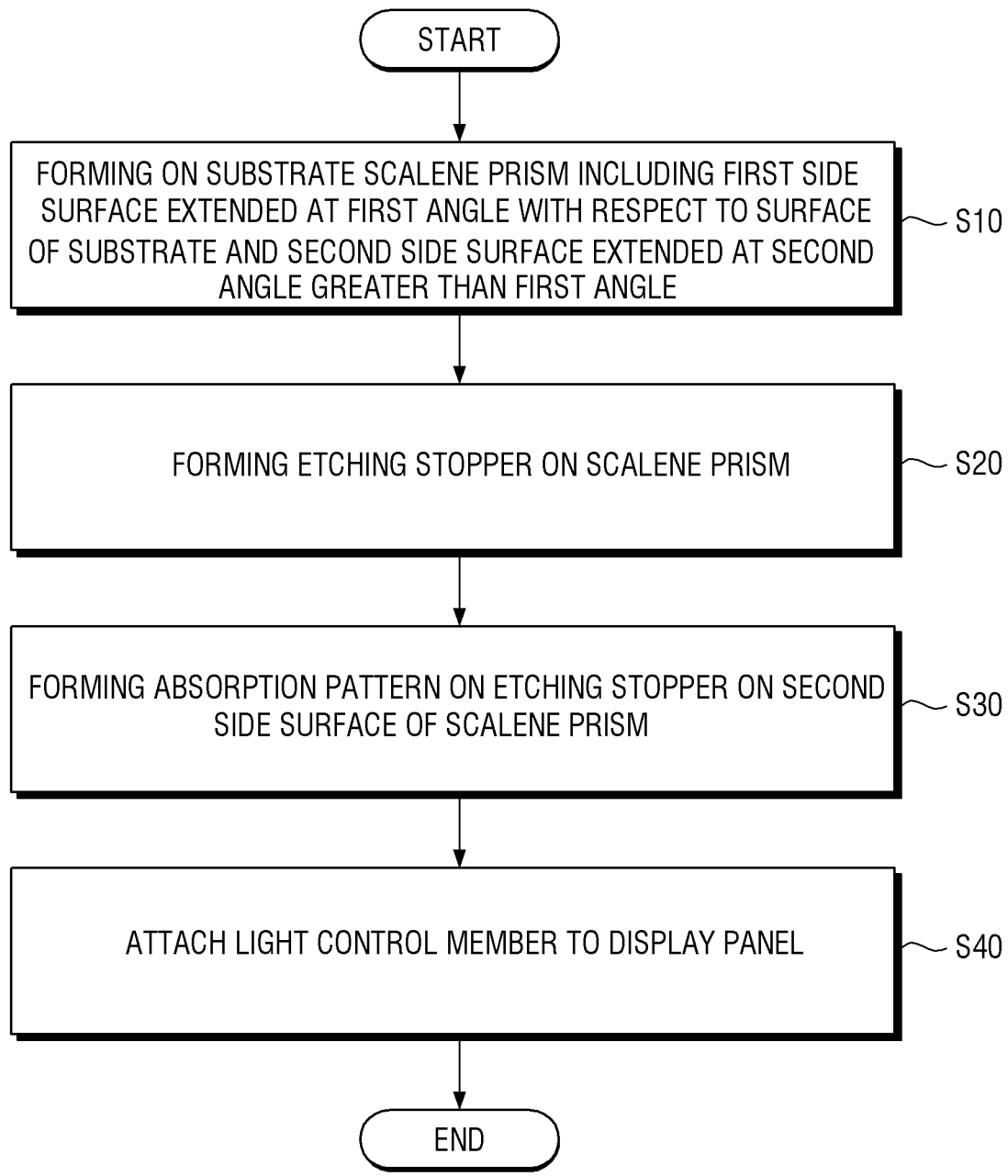
FIG. 5 is a flowchart schematically illustrating a method of fabricating a display device including a light control member according to an embodiment of the disclosure.

FIG. 5 is a flowchart schematically illustrating a method of fabricating a display device including a light control member according to an embodiment of the disclosure. FIGS. 6 to 9 are schematic cross-sectional views illustrating processing steps of the method of fabricating a display device including a light control member according to an embodiment of the disclosure.

Figure 6:
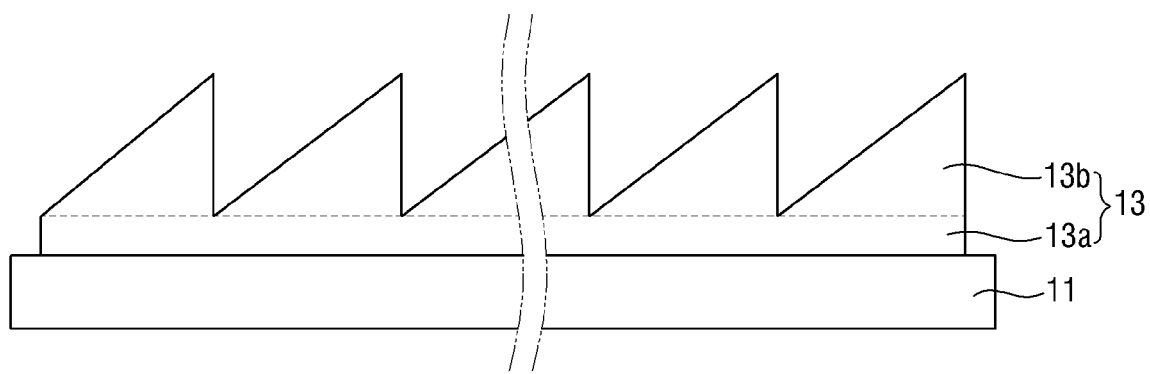
FIGS. 6 to 9 are schematic cross-sectional views illustrating processing steps of a method of fabricating a display device including a light control member according to an embodiment of the disclosure.

Referring initially to FIGS. 5 and 6 in conjunction with FIG. 1, a scalene prism 13 may be formed on the light control substrate 11, which may comprise a first side surface $13S_1$ extended at a first angle $\theta_{13a}$ with respect to the surface of the light control substrate 11, and a second side surface $13S_2$ extended at a second angle $\theta_{13b}$ greater than the first angle $\theta_{13a}$ (step S10).

The configuration, shape, function and material of the scalene prism 13 have been described above; and, therefore, redundant description will be omitted.

The scalene prism 13 may serve to control the path of light incident on the prism 13. More specifically, the scalene prism 13 may have a larger refractive index than that of a medium through which light travels before the scalene prism 13, thereby changing the path of the light so that the light incident on the scalene prism 13 travels more vertically. For example, the scalene prism 13 may have a refractive index larger than the light control substrate 11. The prism 13 may have a refractive index of approximately 1.6.

The prism 13 may include an organic insulating material. The prism 13 may include, for example, an insulating resin. The first prism portion 13a and the second prism portions 13b may include the same insulating resin. The first prism portion 13a and the second prism portions 13b may be integrally formed at the same time via the same fabricating process. For example, the first prism portion 13a and the second prism portions 13b may be formed by imprinting. It is, however, to be understood that the disclosure is not limited thereto. The first prism portion 13a may be first formed on the surface of the light control substrate 11, and the second prism portions 13b may be formed on the first prism portion 13a. In case that the first prism part 13a and the second prism parts 13b may be formed sequentially, an air layer may be formed as a boundary between them. It is, however, to be understood that the disclosure is not limited thereto. The first prism part 13a and the second prism parts 13b may be formed with no boundary therebetween as if they were formed simultaneously.

Figure 7:
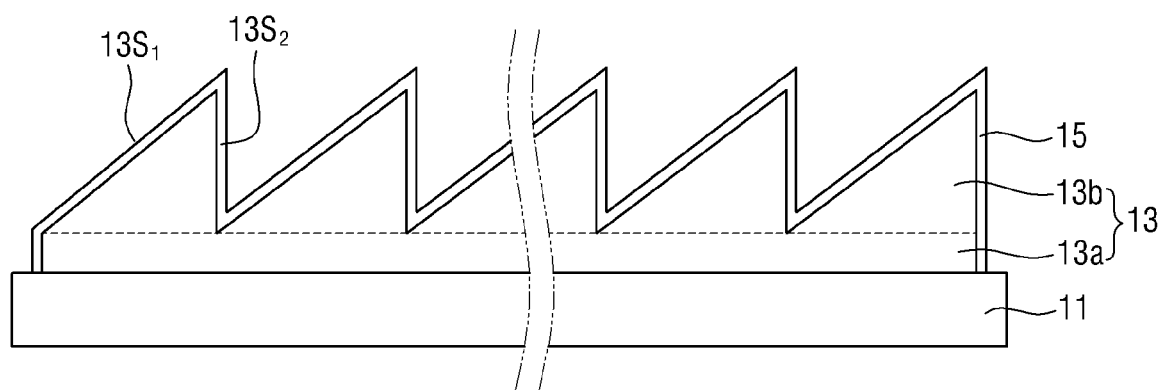

Referring to FIGS. 5 and 7, an etching stopper 15 may be formed on the scalene prism 13 (step S20).

The location, material and function of the etching stopper 15 have been described above; and, therefore, redundant description will be omitted The etching stopper 15 may include at least one of ITO, ZrOx, HfOx and $Al_2O_3$ having a lower etching ratio with respect to the etching gas used for etching the absorption pattern 17 than the material of the absorption pattern 17.

As the etching stopper 15 may be disposed on the first side surface $13S_1$ of the scalene prism 13, the light exiting from the display panel may reach portions of the etching stopper 15 before portions of the scalene prism 13. As the etching stopper 15 may be located in the path of light, it may be desired that the refractive index of the etching stopper 15 may be equal to or greater than that of the scalene prism 13 in order to guide the light in the vertical direction of the scalene prism 13. In view of the above, the refractive index of the etching stopper 15 may be equal to or greater than approximately 1.6, which may be the above-described refractive index of the prism 13. The ITO, ZrOx, HfOx, or $Al_2O_3$ selected to have a lower etch ratio for the etching gas used for etching the absorption pattern 17 than the material of the absorption pattern 17 may have refractive indices of approximately 1.8, approximately 2.2, approximately 1.9, and approximately 1.7, respectively. Accordingly, they can satisfy the condition.

The etching stopper 15 may be formed on surfaces of the prism 13 by atomic layer deposition (ALD). By forming the etching stopper 15 on the surface of the scalene prism 13 in this manner, the etching stopper 15 may have not only the shape conforming to the scalene prism 13 but also a uniform thickness. In case that the etching stopper 15 located in the light path has a uniform thickness, it may be easier to adjust the path of the light incident through the light control member 10.

Figure 8:
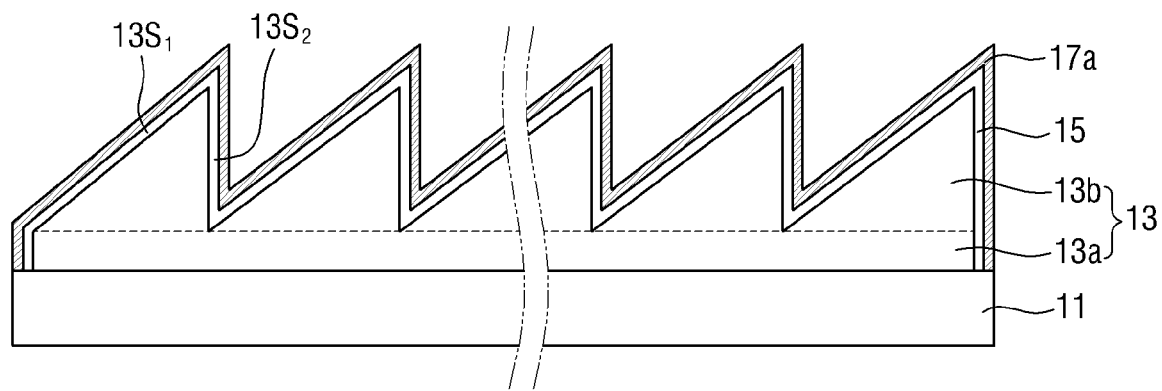
Figure 9:
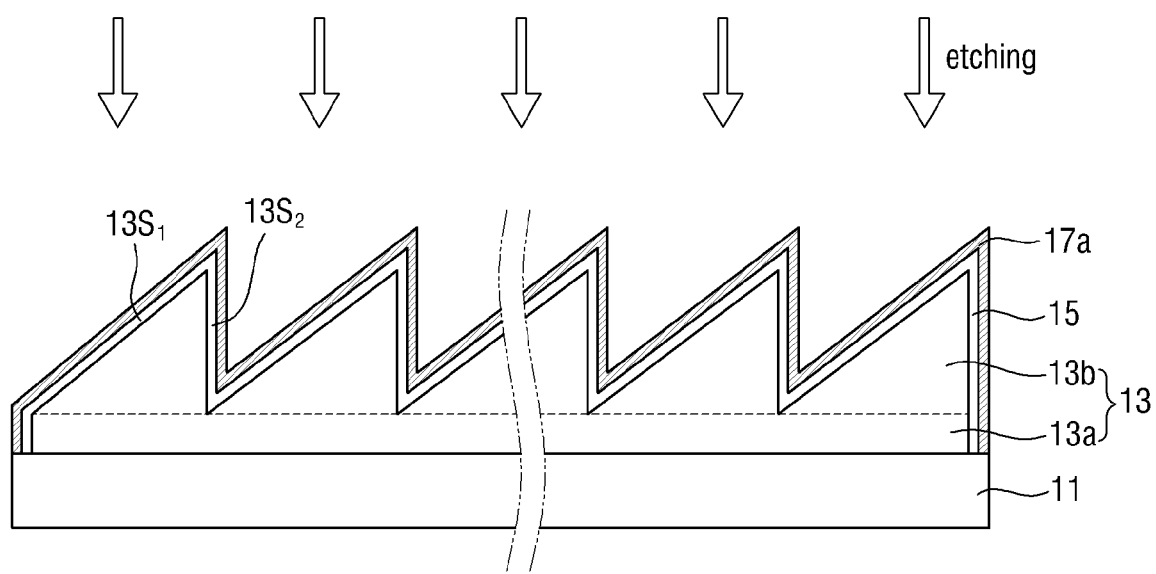

Subsequently, referring to FIGS. 5, 8 and 9 in conjunction with FIG. 1, an absorption pattern 17 may be formed on the etching stopper 15 on the second side surface $13S_2$ of the scalene prism 13 (step S30).

The step S30 of forming the absorption pattern 17 may include forming an absorption pattern material 17a on the etching stopper 15, and etching the absorption pattern material 17a formed on the etching stopper 15.

The forming the absorption pattern material 17a on the etching stopper 15 may include forming the absorption pattern material 17a on the surface (or the entire surface) of the etching stopper 15.

The forming the absorption pattern material 17a on the etching stopper 15 may be carried out by atomic layer deposition (ALD). By forming the absorption pattern material 17a by the atomic layer deposition (ALD), the absorption pattern material 17a can have a substantially uniform thickness on the surface of the etching stopper 15 and can have a shape conforming to the surface of the etching stopper 15.

After the absorption pattern material 17a may be formed on the surface (or the entire surface) of the etching stopper 15, the absorption pattern material 17a may be etched. The etching the absorption pattern material 17a may include a dry etching step. The dry etching may be carried out using an etching gas such as chlorine ($Cl_2$) and fluorine ($F_2$).

The etching stopper 15 may cover the surface (or the entire surface) of the scalene prism 13 to thereby prevent surfaces of the scalene prism 13 from being damaged due to overetching by the etching gas during the process. In view of the above, it may be desired that the etching ratio of the etching stopper 15 with respect to the etching gas of the dry etching may be lower than that of the absorption pattern 17. The larger the etch selectivity may be, which may be the difference between the etching ratios, the better the etching stopper 15 can protect the surfaces of the scalene prism 13.

As described above, the absorption pattern material on the first side surface $13S_1$ of the scalene prism 13 may have a smaller thickness in the thickness direction than the absorption pattern material disposed on the second side surface $13S_2$ of the scalene prism 13, and thus the absorption pattern material on the first side surface $13S_1$ may be removed. The absorption pattern material on the second side surface $13S_2$ of the scalene prism 13 may remain even after the absorption pattern material on the first side surface $13S_1$ of the scalene prism 13 may be removed. As a result, the absorption pattern 17 as shown in FIGS. 1 and 4 may be formed. As shown in FIG. 4, the absorption pattern 17 may expose a part of the upper end of the etching stopper 15. The exposed part may be formed as the absorption pattern material disposed on the second side surface $13S_2$ of the scalene prism 13 may also be partially removed by the dry etching. The length or width t17 of the exposed part may be larger than or smaller than the second thickness $t_2$.

Subsequently, the light control member 10 and the display panel may be attached together (step S40).

The display panel may be an organic display panel including a self-luminous, organic layer, or may be an inorganic display panel including a self-luminous, inorganic semiconductor layer, such as a nano LED and a micro LED. As another example, the display panel may be a liquid-crystal display panel.

The light control member 10 and the display panel may be coupled together via a coupling member or a transparent adhesive member. The transparent adhesive member may include, but is not limited to, an optically clear adhesive (OCA), an optically clear resin (OCR), or a combination thereof.

Hereinafter, a light control member according to another embodiment will be described.

Figure 10:
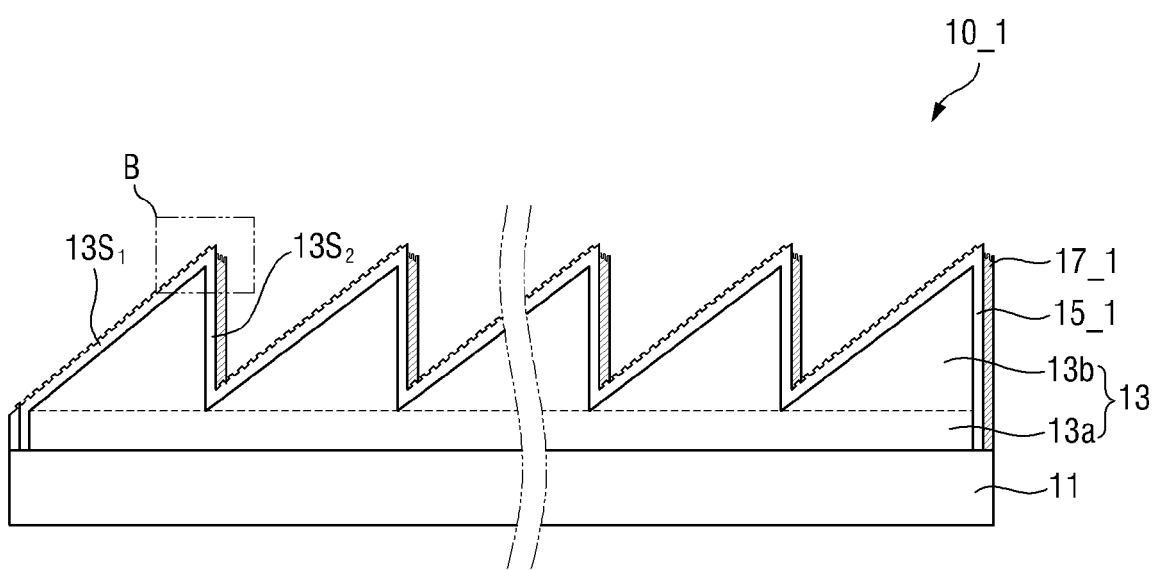
FIG. 10 is a schematic cross-sectional view of a light control member according to another embodiment.
Figure 11:
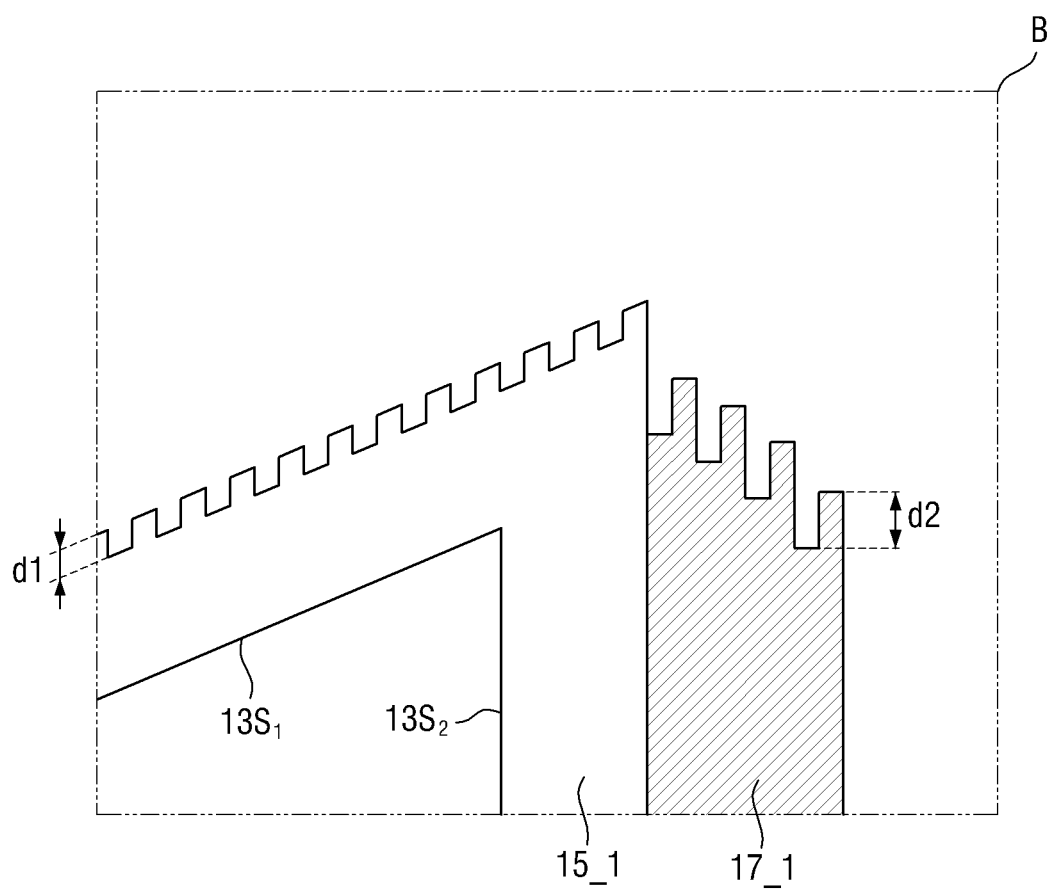
FIG. 11 is a schematic enlarged view of area B of FIG. 10.

FIG. 10 is a schematic cross-sectional view of a light control member according to another embodiment. FIG. 11 is a schematic enlarged view of area B of FIG. 10.

The embodiment of FIGS. 10 and 11 may be different from the embodiment of FIG. 1 in that a light control member 10_1 may further include protrusions on a surface thereabove or the upper surface of an etching stopper 15_1 and an absorption pattern 17_1.

More specifically, the protrusions may be formed in each of the absorption pattern 17_1 and the etching stopper 15_1 in case that the dry etching is carried out to form the ab sorption pattern.

As described above with reference to FIG. 9, the selectivity of the etching gas with respect to the absorption pattern 17_1 may be higher than that of the etching gas with respect to the etching stopper 15_1. For this reason, the depth d1 of the protrusions on the surface of the etching stopper 15_1 may be smaller than the depth d2 of the protrusions of the surface the absorption pattern 17_1.

Figure 12:
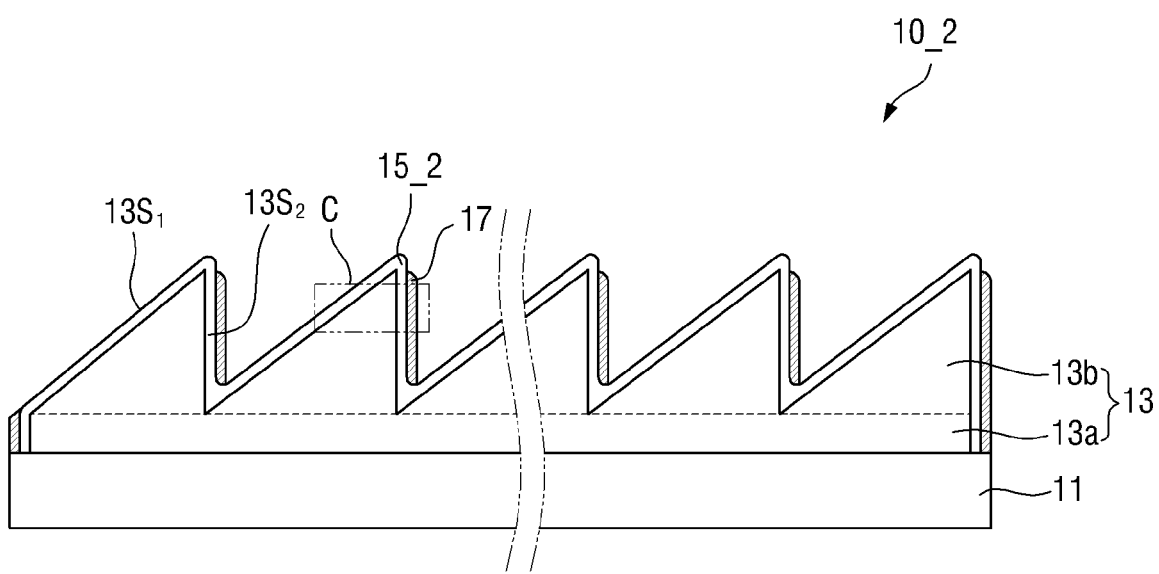
FIG. 12 is a schematic cross-sectional view of a light control member according to yet another embodiment.
Figure 13:
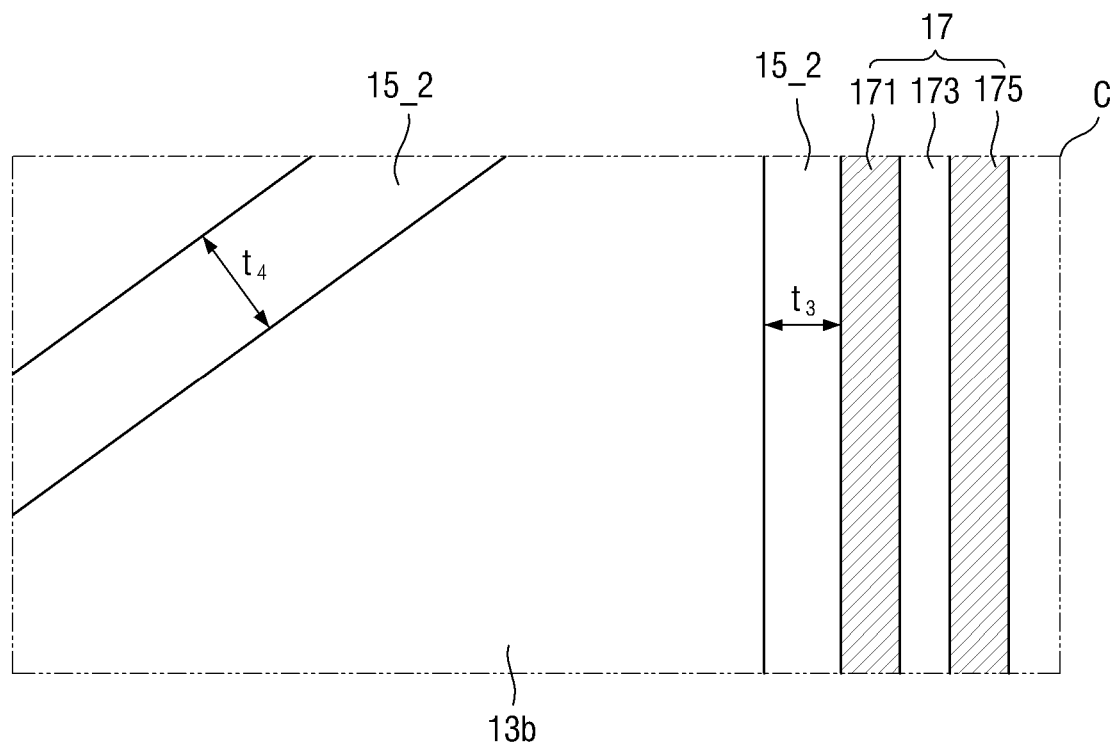
FIG. 13 is a schematic enlarged view of area C of FIG. 12.

FIG. 12 is a schematic cross-sectional view of a light control member according to yet another embodiment. FIG. 13 is a schematic enlarged view of area C of FIG. 12.

The embodiment of FIGS. 12 and 13 may be different from the embodiment of FIG. 1 in that a light control member 10_2 may be formed by chemical vapor deposition (CVD) or sputtering, instead of an atomic layer deposition (ALD) and thus the etching stopper 15_2 may have a non-uniform thickness.

More specifically, a thickness t4 of the etching stopper 15_2 on a first side surface $13S_1$ of the scalene prism 13 may be greater than a thickness $t_3$ of the etching stopper 15_2 on a second side surface $13S_2$ of the scalene prism 13.

Further, in case that the etching stopper 15_2 is formed by chemical vapor deposition (CVD) or sputtering, step coverage (the degree of reflecting the step difference of features under a surface) may be lowered, compared to that formed by atomic layer deposition (ALD). As a result, the end or bending point of the scalene prism 13 may not reflect the shape of the end or bending portion of the features thereunder but may have a substantially curved shape that may be convex outward.

Figure 14:
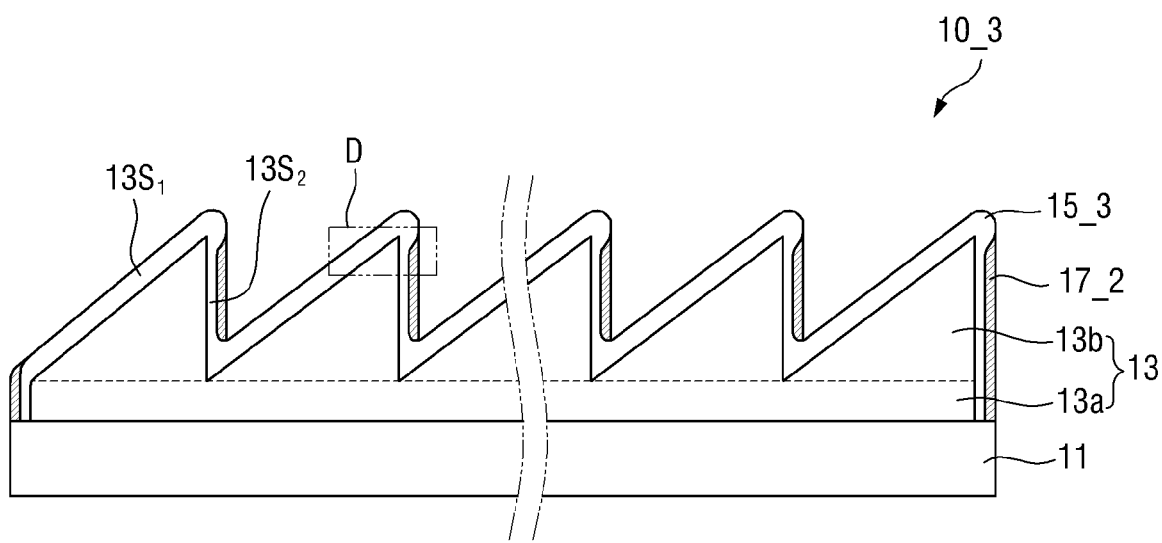
FIG. 14 is a schematic cross-sectional view of a light control member according to yet another embodiment.
Figure 15:
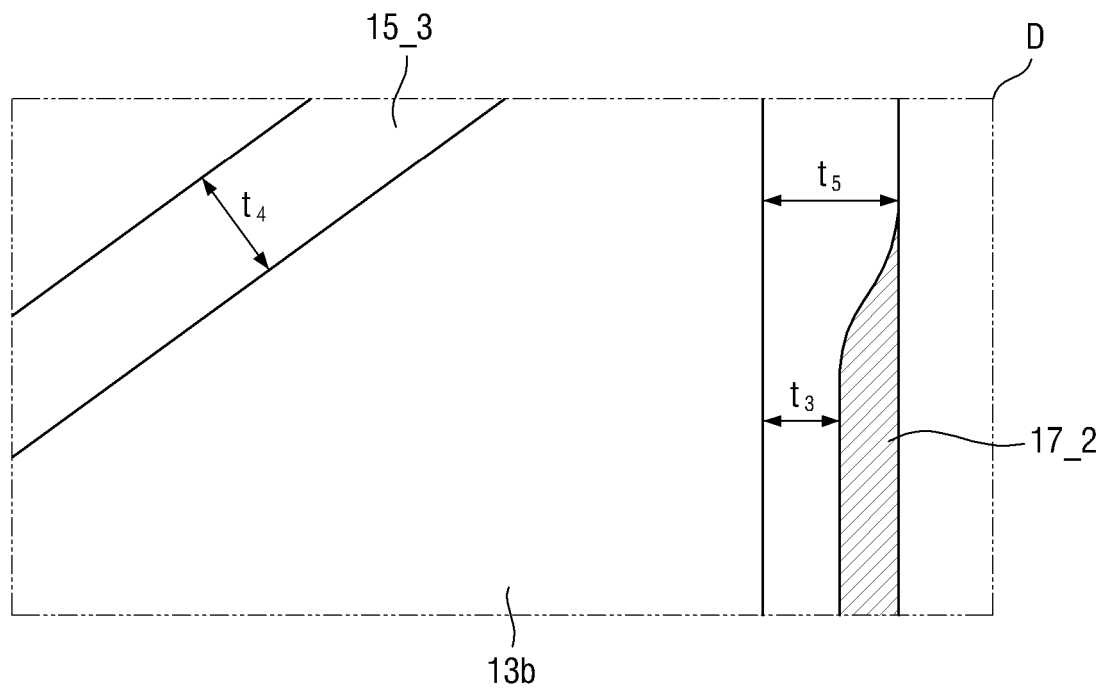
FIG. 15 is a schematic enlarged view of portion D of FIG. 14.

FIG. 14 is a schematic cross-sectional view of a light control member according to yet another embodiment. FIG. 15 is a schematic enlarged view of portion D of FIG. 14.

The embodiment of FIGS. 14 and 15 may be different from the embodiment of FIGS. 12 and 13 in that an etching stopper 15_3 disposed on a second side surface 12S2 of a scalene prism 13 may have different thicknesses.

More specifically, the etching stoppers 15_3 disposed on the second side surface $13S_2$ of the scalene prism 13 according to the embodiment may have different thicknesses. In other words, the thickness t5 of a portion of the etching stopper 15_3 closer to the end of the scalene prism 13 (upper portion in the drawings) may be greater than the thickness $t_3$ of a portion of the etching stopper 15_3 farther from the end of the scalene prism 13 (lower portion in the drawings). This may happen in case that the etching stopper is formed by the above-described chemical vapor deposition (CVD) or sputtering, because a deposition apparatus may spray a deposition material from above and thus the deposition material may be deposited firstly on the portion closer to the end of the scalene prism 13. As a result, the portion thereunder may be blocked by the deposition material and a small amount of deposition material may be deposited on the lower portion, and an absorption pattern 17_2 may be in contact with the lower portion.

Figure 16:
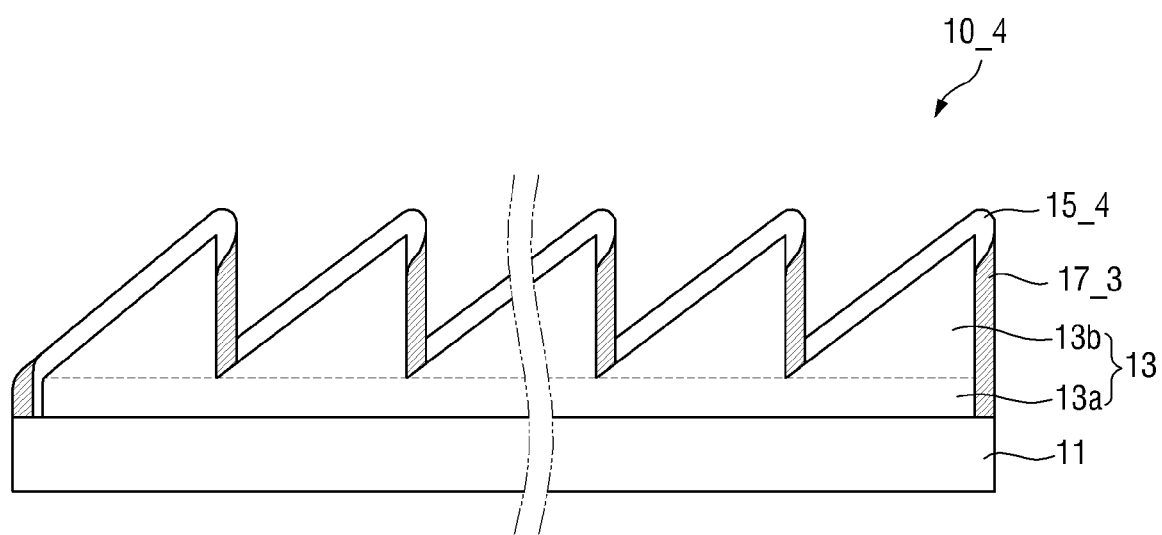
FIG. 16 is a schematic cross-sectional view of a light control member according to yet another embodiment.

FIG. 16 is a schematic cross-sectional view of a light control member according to yet another embodiment.

The embodiment of FIG. 16 may be different from the embodiment of FIGS. 14 and 15 in that an etching stopper 15_4 may expose a part of a second side surface $13S_2$ of a scalene prism 13.

More specifically, in the light control member 10_4 according to this embodiment, the etching stopper 15_4 may expose a part of the second side surface $13S_2$ of the scalene prism 13, and an absorption pattern 17_3 may be in contact with the exposed part of the second side surface $13S_2$ of the scalene prism 13.

Hereinafter, a display device including the above-described light control member will be described. In the following description, the same or similar elements will be denoted by the same or similar reference numerals, and redundant descriptions will be omitted or briefly described.

Figure 17:
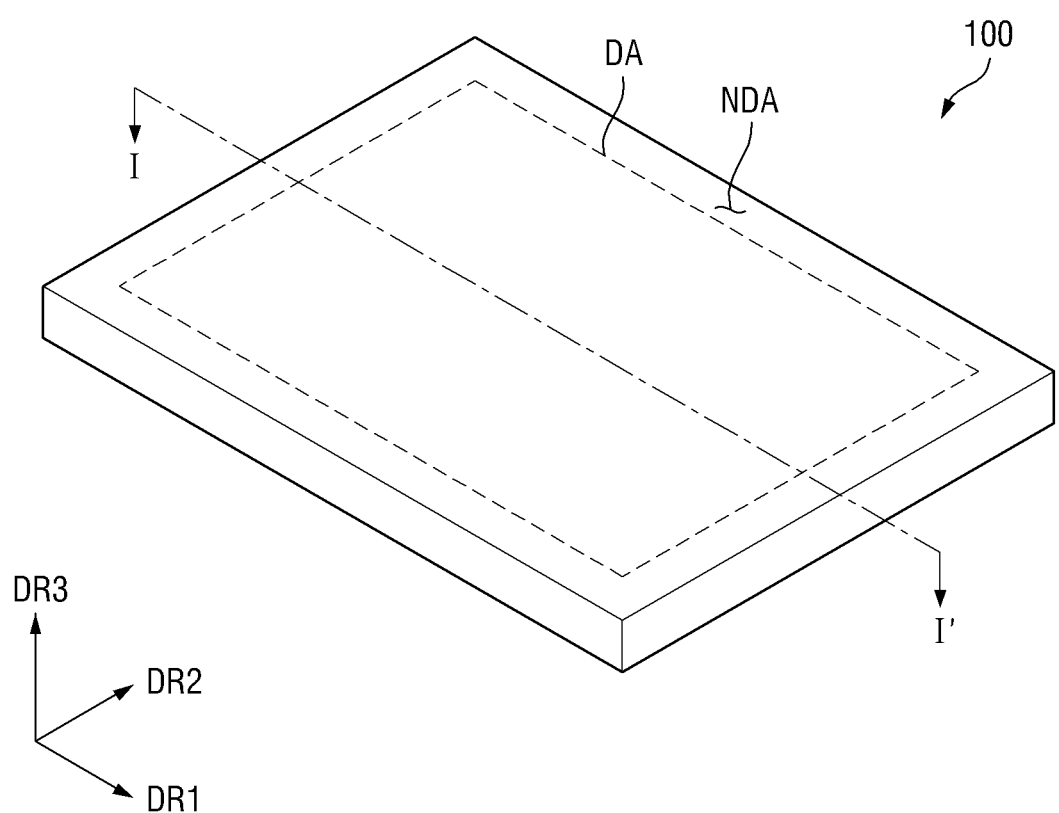
FIG. 17 is a schematic perspective view of a display device according to an embodiment of the disclosure.
Figure 18:
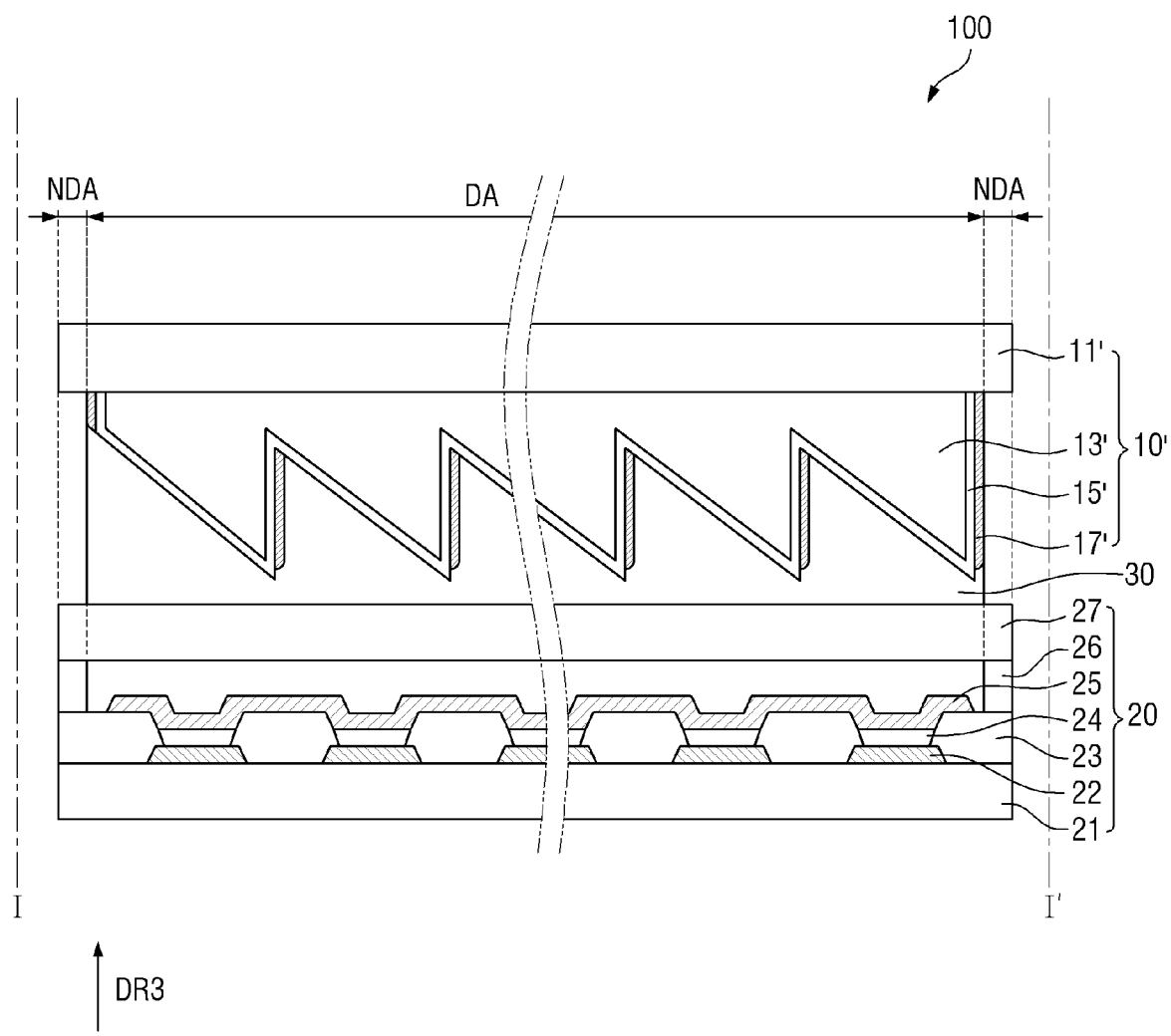
FIG. 18 is a schematic cross-sectional view taken along line I-I' of FIG. 17.

FIG. 17 is a schematic perspective view of a display device according to an embodiment of the disclosure. FIG. 18 is a schematic cross-sectional view taken along line I-I' of FIG. 17.

Referring to FIGS. 17 and 18, the display device 100 according to this embodiment may be a display device 100 including a light control member 10'. The display device 100 may further include a display part 20, and a coupling member 30 disposed between the display part 20 and the light control member 10' to couple them each other.

The light control member 10' may have substantially the same configuration as the light control member 10 described above with reference to FIG. 1. Any of the light control member 10_1 of FIG. 10, the light control member 10_2 of FIG. 12 and the light control member 10_3 of FIG. 14 may be employed as the light control member 10' without departing from the scope of the disclosure.

In an embodiment, the first direction D1 may intersect the second direction D2. In the perspective view of FIG. 17, the first direction DR1 may be defined as the horizontal direction of the display device 100 while the second direction DR2 may be defined as the vertical direction of the display device 100 for convenience of illustration. It should be understood that the directions referred with respect to the embodiments may be relative directions, and the embodiments are not limited to the directions mentioned.

The display device 100 according to an embodiment of the disclosure may be an organic light-emitting display device including an organic display panel including a self-luminous organic layer.

The display device 100 may include a display area DA for displaying images, and a non-display area NDA disposed around the display area DA. The display area DA may include pixels.

Although the display device 100 may have a rectangular shape viewed from the top, the disclosure is not limited thereto. It is to be understood that the display device 100 may have a square shape, a circular shape, an elliptical shape or other polygonal shapes.

The display part 20 may include a first substrate 21 and light-emitting elements disposed on the first substrate 21.

The first substrate 21 may be an insulating substrate. The first substrate 21 may include a transparent material. For example, the first substrate 21 may include a transparent insulating material such as glass, quartz, or a combination thereof. The first substrate 21 may be a rigid substrate. However, the first substrate 21 is not limited to those described above. The first substrate 21 may include a plastic such as polyimide. The first substrate 21 may be flexible so that it may be curved, bent, folded or rolled.

Pixel electrodes 22 may be disposed on the surface of the first substrate 21. Each of the pixel electrodes 22 may be disposed in the respective pixels. The pixel electrode 22 of one of the pixels may be spaced apart from the pixel electrode of an adjacent one of the pixels. A circuit layer (not shown) for driving the pixel electrodes 22 may be disposed between the first substrate 21 and the pixel electrodes 22. The circuit layer may include thin-film transistors and a capacitor.

The pixel electrode 22 may be a first electrode of the light-emitting element (or light-emitting diode), for example, an anode electrode. The pixel electrode 22 may have a stack structure of a material layer having a high work function such as indium-tin-oxide (ITO), indium-zinc-oxide (IZO), zinc oxide (ZnO) and indium oxide ($In_2O_3$), and a reflective material layer such as silver (Ag), magnesium (Mg), aluminum (Al), platinum (Pt), lead (Pd), gold (Au), nickel (Ni), neodymium (Nd), iridium (Ir), chromium (Cr), lithium (Li), calcium (Ca) or a mixture thereof. A material layer having a higher work function may be disposed on a higher layer than a reflective material layer so that it may be closer to an emissive layer 24. The pixel electrode 22 may have, but is not limited to, a multilayer structure of ITO/Mg, ITO/MgF, ITO/Ag, and ITO/Ag/ITO.

A bank layer 23 may be disposed on the surface of the first substrate 21 along the boundary of the pixels. The bank layer 23 may be disposed over the pixel electrodes 22 and may include openings exposing the pixel electrodes 22, respectively. The bank layer 23 may include an organic insulating material such as polyacrylate resin, epoxy resin, phenolic resin, polyamide resin, polyimide resin, unsaturated polyesters resin, poly phenylen ether resin, poly phenylene sulfide resin, benzocyclobutene (BCB), or a combination thereof. The bank layer 23 may include an inorganic material.

The emissive layer may be disposed on the pixel electrodes 22 exposed via the bank layer 23. In an embodiment where the display device may be an organic light-emitting display device, the emissive layer 24 may include an organic layer including an organic material. The organic layer may include an organic, emissive layer 24 and may further include hole injection/transport layers and/or electron injection/transport layers as auxiliary layers in some implementations to facilitate emission. In another embodiment where the display device may be a micro LED display device, a nano LED display device, etc., the emissive layer 24 may include an inorganic material such as an inorganic semiconductor.

A common electrode 25 may be disposed on the emissive layer 24. The common electrode 25 may be in contact with the upper surface of the bank layer 23 as well as the emissive layer 24.

The common electrode 25 may be extended across the pixels. The common electrode 25 may be a single, continuous piece disposed throughout the pixels. The common electrode 25 may be a second electrode of the light-emitting diode, i.e., a cathode electrode.

The common electrode 25 may include a material layer having a small work function such as Li, Ca, LiF/Ca, LiF/Al, Al, Mg, Ag, Pt, Pd, Ni, Au, Nd, Ir, Cr, BaF and Ba, or a compound or mixture thereof (e.g., a mixture of Ag and Mg). The common electrode 25 may further include a transparent metal oxide layer disposed on the material layer having a small work function.

The pixel electrode 22, the emissive layer 24 and the common electrode 25 may form a light-emitting element, e.g., an organic light-emitting element. Light emitted from the emissive layer 24 may pass through the common electrode 25 to exit upwardly.

A thin-film encapsulation feature 27 may be disposed above the common electrode 25. The thin-film encapsulation feature 27 may include an encapsulation substrate or a second substrate. The encapsulation substrate may be an insulating substrate. The encapsulation substrate may include a transparent material. For example, the encapsulation substrate may include a transparent insulating material such as glass, quartz, or a combination thereof. The encapsulation substrate may be a rigid substrate. The encapsulation substrate may be of the same kind as the first substrate 21 or may be a substrate having a material, a thickness, a transmittance, etc. different from those of the first substrate 21. For example, the encapsulation substrate may have a higher transmittance than that of the first substrate 21. The encapsulation substrate may be thicker or thinner than the first substrate 21.

However, the encapsulation substrate is not limited to those described above. The encapsulation substrate may include a plastic such as polyimide. The encapsulation substrate may be flexible so that it may be curved, bent, folded or rolled.

A sealing member 26 may be disposed between the thin-film encapsulation feature 27 and the first substrate 21. The sealing member 26 may be disposed in the non-display area NDA. The sealing member 26 may be disposed between the upper surface of the bank layer 23 and the thin-film encapsulation feature 27 and may also be in contact with the upper surface of the bank layer 23 and the thin-film encapsulation feature 27 to couple the first substrate 21 with the thin-film encapsulation feature 27.

The light control member 10' described above may be disposed on the thin-film encapsulation feature 27. The coupling member 30 may be disposed between the light control member 10' and the thin-film encapsulation feature 27. A scalene prism 13' may be disposed between a light control substrate 11' of the light control member 10' and the coupling member 30. An etching stopper 15' may be disposed between the scalene prism 13' and the coupling member 30. The coupling member 30 may be in contact with the exposed absorption pattern 17' and the etching stopper 15' of the light control member 10'.

Figure 19:
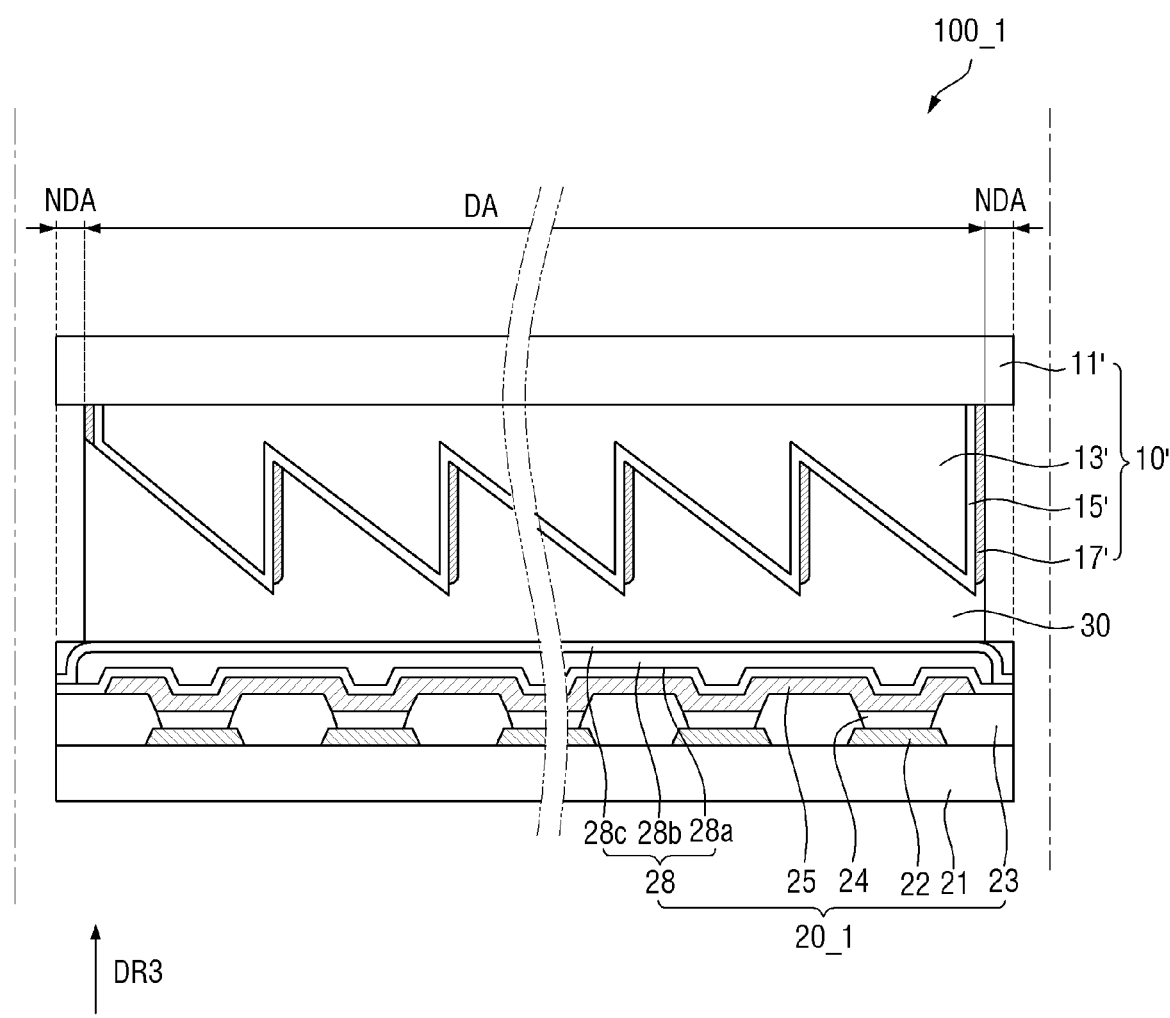
FIG. 19 is a schematic cross-sectional view of a display device according to another embodiment of the disclosure.

FIG. 19 is a schematic cross-sectional view of a display device according to another embodiment of the disclosure.

A display device 100_1 according to the embodiment of FIG. 19 may be different from the embodiment of FIG. 18 in that a thin-film encapsulation feature 28 of a display part 20_1 may be different from the thin-film encapsulation feature 27 of FIG. 18.

More specifically, the thin-film encapsulation feature 28 according to this embodiment may include at least one thin-film encapsulation layer. For example, the thin-film encapsulation layer may include a first inorganic layer 28a, an organic layer 28b, and a second inorganic layer 28c. Each of the first inorganic layer 28a and the second inorganic layer 28c may include silicon nitride, silicon oxide, silicon oxynitride, or the like, or a combination thereof. The organic layer 28b may include an organic insulating material such as polyacrylate resin, epoxy resin, phenolic resin, polyamide resin, polyimide resin, unsaturated polyesters resin, polyphenylene ether resin, polyphenylene sulfide resin, benzocyclobutene (BCB), or a combination thereof.

The coupling member 30 may be disposed between the light control member 10' and the thin-film encapsulation structure 28. The coupling member 30 may be in contact with the exposed absorption pattern 17' and the etching stopper 15' of the light control member 10' and with the second inorganic layer 28c of the thin-film encapsulation features 28.

Figure 20:
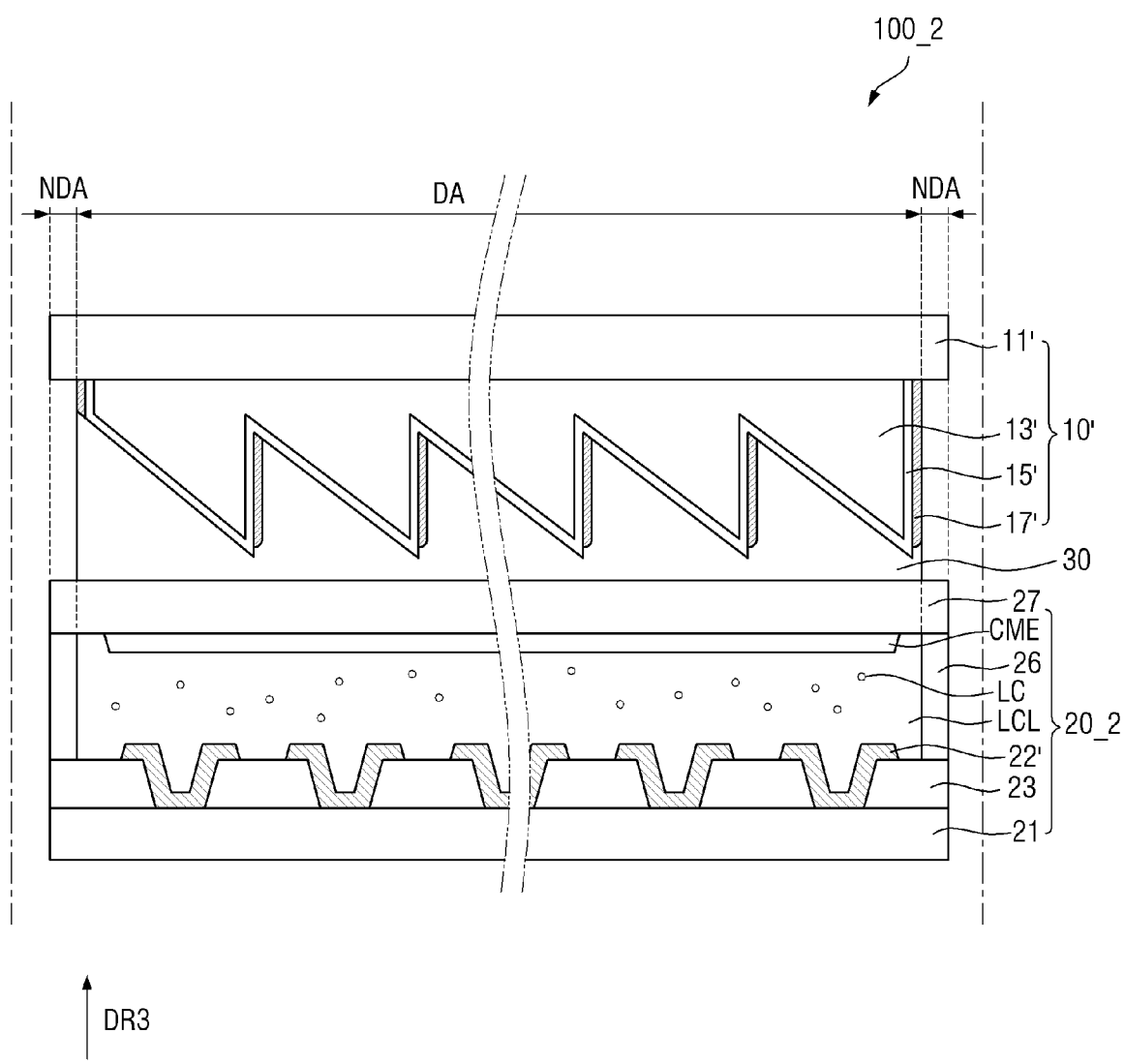
FIG. 20 is a schematic cross-sectional view of a display device according to yet another embodiment of the disclosure.

FIG. 20 is a schematic cross-sectional view of a display device according to yet another embodiment of the disclosure.

The embodiment of FIG. 20 may be different from the embodiment of FIG. 18 in that a display device 100_2 may be a liquid-crystal display device in which a display panel 20_2 may include a liquid-crystal display panel.

More specifically, a display device 100_2 according to this embodiment may be a liquid-crystal display device in which the display part 20_2 may include a liquid-crystal crystal display panel.

The display part 20_2 may include a first substrate 21, a second substrate 27 facing the first substrate 21, a bank layer 23 disposed on the first substrate 21, pixel electrodes 22' disposed in openings of the bank layer 23, respectively, a common electrode CME disposed on the lower surface of the second substrate 27, and a liquid-crystal layer LCL disposed between the common electrode CME and the pixel electrodes 22' and including liquid-crystal molecules LC.

The pixel electrodes 22' may be different from the pixel electrodes 22 of FIG. 18 in that they may be disposed on the bank layer 23, i.e., on the side surfaces and parts of the upper surfaces of the bank layer.

The common electrode CME may be different from the common electrode CME of FIG. 18 in that the common electrode CME may be not disposed on the first substrate 21 but on the second substrate 27.

The other elements may be identical to those described above with reference to FIG. 18; and, therefore, redundant description will be omitted.

The other elements may be identical to those described above with reference to FIG. 4; and, therefore, redundant description will be omitted.

Although embodiments of the invention have been disclosed for illustrative purposes, those skilled in the art will appreciate that various modifications, additions and substitutions are possible, without departing from the scope and spirit of the invention as disclosed in the accompanying claims including any equivalents.

What is claimed is:

1. A light control member comprising:
    a light control substrate including a surface;
    a scalene prism disposed on the light control substrate and including:
        a first side surface extended at a first angle with respect to the surface of the light control substrate; and
        a second side surface extended at a second angle with respect to the surface of the light control substrate, the second angle being greater than the first angle;

an etching stopper disposed on the scalene prism; and
at least one absorption pattern disposed on the etching stopper on the second side surface of the scalene prism.

2. The light control member of claim 1, wherein the etching stopper is disposed on the first side surface and the second side surface of the scalene prism.

3. The light control member of claim 2, wherein the scalene prism comprises a resin.

4. The light control member of claim 2, wherein the at least one absorption pattern is in direct contact with the etching stopper on the second side surface of the scalene prism.

5. The light control member of claim 1, wherein
a refractive index of the scalene prism is approximately 1.6,
a refractive index of the etching stopper is greater than the refractive index of the scalene prism, and
the etching stopper comprises at least one of indium-tin-oxide (ITO), zirconium oxide (ZrOx), hafnium oxide (HfOx) and aluminum oxide ($Al_2O_3$).

6. The light control member of claim 1, wherein the scalene prism comprises:
a first prism part in contact with the light control substrate; and
at least one second prism part extended from the first prism part and having a triangular, cross-sectional shape.

7. The light control member of claim 6, wherein the cross-sectional shape of the second prism part comprises a scalene triangular shape.

8. The light control member of claim 6, wherein
the at least one second prism part comprises a plurality of second prism parts,
the at least one absorption pattern comprises a plurality of absorption patterns, and
the plurality of absorption patterns are disposed on second side surfaces of the plurality of second prism parts, respectively.

9. The light control member of claim 8, wherein a height of each of the plurality of absorption patterns in a thickness direction is approximately 1.1 to approximately 1.4 times a pitch between adjacent ones of the plurality of absorption patterns.

10. The light control member of claim 1, wherein a surface height of the at least one absorption pattern is smaller than a surface height of the etching stopper.

11. The light control member of claim 1, wherein a thickness of the etching stopper disposed on the first side surface of the scalene prism is equal to a thickness of the etching stopper disposed on the second side surface of the scalene prism.

12. The light control member of claim 1, wherein a thickness of the etching stopper disposed on the first side surface of the scalene prism is greater than a thickness of the etching stopper disposed on the second side surface of the scalene prism.

13. The light control member of claim 1, wherein
each of the etching stopper and the at least one absorption pattern comprises protrusions on a surface thereof, and
a depth of the protrusions of the at least one absorption pattern is larger than a depth of the protrusions of the etching stopper.

14. A display device comprising:
a first substrate;
a light-emitting element disposed on the first substrate; and
a light control member disposed on the light-emitting element,
wherein the light control member comprises:
a light control substrate including a surface;
a scalene prism disposed on the light control substrate and including:
a first side surface extended at a first angle with respect to the surface of the light control substrate; and
a second side surface extended at a second angle with respect to the surface of the light control substrate, the second angle being greater than the first angle;
an etching stopper disposed on the scalene prism; and
an absorption pattern disposed on the etching stopper on the second side surface of the scalene prism.

15. The display device of claim 14, wherein
the scalene prism is disposed between the light control substrate and the light-emitting element, and
the etching stopper is disposed between the scalene prism and the light-emitting element.

16. The display device of claim 15, wherein the light-emitting element comprises:
a first electrode disposed on the first substrate;
a second electrode facing the first electrode; and
an emissive layer disposed between the first electrode and the second electrode.

17. The display device of claim 16, further comprising a bank layer disposed on the first electrode and having an opening, wherein
a part of an upper surface of the first electrode is exposed through the opening, and
the emissive layer is disposed in the opening.

18. The display device of claim 17, further comprising a second substrate facing the first substrate and disposed above the light-emitting element, wherein
the second substrate seals the light-emitting element, and
the light control member is disposed on the second substrate.

19. The method of claim 18, wherein the first angle of the first side surface is greater than the second angle of the second side surface.

20. The display device of claim 17, further comprising an encapsulation layer disposed over the light-emitting element and encapsulating the light-emitting element, wherein the light control member is disposed on the encapsulation layer.

21. A method of fabricating a display device, the method comprising:
forming a light control member; and
attaching the light control member to a display panel,
wherein the forming the light control member comprises:
forming a scalene prism on a substrate, the scalene prism comprising a first side surface extended at a first angle with respect to a surface of the substrate and a second side surface extended at a second angle with respect to the substrate;
forming an etching stopper on the scalene prism; and
forming an absorption pattern on the etching stopper on the second side surface of the scalene prism.

22. The method of claim 21, wherein
the scalene prism comprises a resin, and
the forming the scalene prism comprises forming the scalene prism by imprinting.

23. The method of claim 21, wherein the forming the etching stopper comprises forming the etching stopper by atomic layer deposition (ALD), chemical vapor deposition (CVD), or sputtering.

24. The method of claim 21, wherein the forming the absorption pattern on the etching stopper on the second side surface of the scalene prism comprises:
   forming an absorption pattern material over the etching stopper; and
   dry etching to expose the etching stopper on the first side surface of the scalene prism.

* * * * *